US012561897B2

(12) United States Patent
Lakshminarayana et al.

(10) Patent No.: US 12,561,897 B2
(45) Date of Patent: Feb. 24, 2026

(54) COMPRESSED REPRESENTATIONS FOR APPEARANCE OF FIBER-BASED DIGITAL ASSETS

(71) Applicant: Adobe Inc., San Jose, CA (US)

(72) Inventors: Krishna Bhargava Mullia Lakshminarayana, San Francisco, CA (US); Xin Sun, Santa Clara, CA (US); Miloš Hašan, Lafayette, CA (US); Fujun Luan, Menlo Park, CA (US)

(73) Assignee: Adobe Inc., San Jose, CA (US)

( * ) Notice: Subject to any disclaimer, the term of this patent is extended or adjusted under 35 U.S.C. 154(b) by 139 days.

(21) Appl. No.: 18/354,855

(22) Filed: Jul. 19, 2023

(65) Prior Publication Data

US 2025/0029323 A1    Jan. 23, 2025

(51) Int. Cl.
*G06T 15/50* (2011.01)
*G06T 15/00* (2011.01)
*G06T 15/06* (2011.01)

(52) U.S. Cl.
CPC .......... *G06T 15/506* (2013.01); *G06T 15/005* (2013.01); *G06T 15/06* (2013.01); *G06T 2210/21* (2013.01); *G06T 2210/56* (2013.01)

(58) Field of Classification Search
None
See application file for complete search history.

(56) References Cited

U.S. PATENT DOCUMENTS

| | | |
|---|---|---|
| 8,102,393 B1 | 1/2012 | Everitt et al. |
| 2006/0028474 A1 | 2/2006 | Pfister et al. |
| 2016/0078640 A1 | 3/2016 | Sheppard et al. |
| 2022/0335636 A1 | 10/2022 | Bi et al. |

(Continued)

FOREIGN PATENT DOCUMENTS

WO      WO-2021061441 A1 *   4/2021   ........... G02B 27/017

OTHER PUBLICATIONS

Marschner et al., Light Scattering from Human Hair Fibers, ACM Transactions on Graphics (TOG), vol. 22, Issue 3, pp. 780-791 (Year: 2003).*

(Continued)

*Primary Examiner* — Zhengxi Liu
*Assistant Examiner* — Biao Chen
(74) *Attorney, Agent, or Firm* — FIG. 1 Patents

(57)    ABSTRACT

Techniques for generation of compressed representations for appearance of fiber-based digital assets are described that support computationally efficient and high fidelity rendering of digital assets that include fiber primitives under a variety of lighting conditions and view directions. A processing device, for instance, receives a digital asset that includes fiber primitives to be included in a three-dimensional digital scene. The processing device generates a compressed representation of the digital asset that maintains a geometry of the digital asset and includes a precomputed light transport. The processing device then inserts the compressed representation into the digital scene, such as at a location relative to one or more light sources. The processing device applies one or more lighting effects to the compressed representation based on the precomputed light transport and the location relative to the one or more light sources.

20 Claims, 10 Drawing Sheets
(6 of 10 Drawing Sheet(s) Filed in Color)

900

(56) References Cited

U.S. PATENT DOCUMENTS

| | | |
|---|---|---|
| 2024/0087217 A1 | 3/2024 | Harviainen |
| 2024/0177414 A1 | 5/2024 | Lee et al. |
| 2025/0131647 A1 | 4/2025 | Talegaonkar et al. |
| 2025/0139878 A1 | 5/2025 | Lakshminarayana et al. |

OTHER PUBLICATIONS

Wang et al., Relighting in spatial augmented reality, 2010 International Conference on Audio, Language and Image Processing (2010, pp. 224-229), (Year: 2010).*

Gao et al., Simulating Multi-Scale, Granular materials and their transitions with a hybrid Euler-Lagrange solver, IEEE Transactions on visualization and computer graphics, vol. 27, No. 12, Dec. 2021, pp. 4484-4495 (Year: 2021).*

"Mitsuba 3 Physically Based Renderer", Mitsuba [retrieved Mar. 20, 2023]. Retrieved from the Internet <http://www.mitsuba-renderer.org/>., 1 Page.

"Substance 3D Assets library", Adobe [retrieved Mar. 16, 2023]. Retrieved from the Internet <https://substance3d.adobe.com/assets/>., 7 Pages.

Alla Chaitanya, Chakravarty R. et al., "Interactive reconstruction of Monte Carlo image sequences using a recurrent denoising autoencoder", ACM Transactions on Graphics, vol. 36, No. 4 [retrieved Mar. 19, 2023]. Retrieved from the Internet <https://research.nvidia.com/sites/default/files/publications/dnn_denoise_author.pdf>., Jul. 20, 2017, 12 Pages.

Bako, Steve et al., "Kernel-predicting convolutional networks for denoising Monte Carlo renderings", ACM Transactions on Graphics, vol. 36, No. 4 [retrieved Mar. 19, 2023]. Retrieved from the Internet <https://la.disneyresearch.com/wp-content/uploads/Kernel-Predicting-Convolutional-Networks-for-Denoising-Monte-Carlo-Renderings-Paper33.pdf>., Jul. 20, 2017, 14 Pages.

Becker, Barry et al., "Smooth Transitions between Bump Rendering Algorithms", University of California, Davis and Lawrence Livermore National Laboratory [retrieved Mar. 16, 2023]. Retrieved from the Internet <https://dl.acm.org/doi/pdf/10.1145/166117.166141>., 1993, 7 Pages.

Bi, Sai et al., "Neural Reflectance Fields for Appearance Acquisition", Cornell University arXiv, arXiv.org [retrieved Mar. 16, 2023]. Retrieved from the Internet <https://arxiv.org/pdf/2008.03824.pdf>., Aug. 16, 2020, 11 Pages.

Bruneton, Eric et al., "A Survey of Nonlinear Prefiltering Methods for Efficient and Accurate Surface Shading", IEEE Transactions on Visualization and Computer Graphics, vol. 18, No. 2 [retrieved Mar. 16, 2023]. Retrieved from the Internet <https://hal.inria.fr/inria-00589940v1/document>., Apr. 21, 2011, 22 Pages.

Chan, Eric R. et al., "Efficient Geometry-aware 3D Generative Adversarial Networks", Cornell University arXiv, arXiv.org [retrieved Mar. 19, 2023]. Retrieved from the Internet <https://arxiv.org/pdf/2112.07945.pdf>., Apr. 27, 2022, 27 Pages.

Chen, Anpei et al., "TensoRF: Tensorial Radiance Fields", Cornell University arXiv, arXiv.org [retrieved Mar. 19, 2023]. Retrieved from the Internet <https://arxiv.org/pdf/2203.09517.pdf>., Nov. 29, 2022, 33 Pages.

Chiang, Matt Jen-Yuan et al., "A practical and controllable hair and fur model for production path tracing", Proceedings of the 37th Annual Conference of the European Association for Computer Graphics [retrieved Mar. 16, 2023]. Retrieved from the Internet <https://media.disneyanimation.com/uploads/production/publication_asset/147/asset/siggraph2015Fur.pdf>., May 9, 2016, 1 Page.

Chu, Mengyu et al., "Data-Driven Synthesis of Smoke Flows with CNN-based Feature Descriptors", Cornell University arXiv, arXiv.org [retrieved Mar. 19, 2023]. Retrieved from the Internet <https://arxiv.org/pdf/1705.01425.pdf>., Jul. 25, 2017, 14 Pages.

Dana, Kristin J. et al., "Reflectance and texture of real-world surfaces", ACM Transactions on Graphics, vol. 18, No. 1 [retrieved Mar. 19, 2023]. Retrieved from the Internet <https://cseweb.ucsd.edu/~ravir/274/15/papers/tog99.pdf>., Jan. 1, 1999, 34 Pages.

Deng, Hong et al., "Constant-Cost Spatio-Angular Prefiltering of Glinty Appearance Using Tensor Decomposition", Cornell University arXiv, arXiv.org [retrieved Mar. 19, 2023]. Retrieved from the Internet <https://arxiv.org/pdf/2109.14807.pdf>., Sep. 30, 2021, 16 Pages.

D'Eon, Eugene et al., "An Energy-Conserving Hair Reflectance Model", Computer Graphics Forum, vol. 30, No. 4 [retrieved Mar. 19, 2023]. Retrieved from the Internet <https://citeseerx.ist.psu.edu/document?repid=rep1&type=pdf&doi=8b156ce153be184e75ef780d194b72320da78200>., Jul. 19, 2011, 7 Pages.

Dupuy, Jonathan et al., "Linear efficient antialiased displacement and reflectance mapping", ACM Transactions on Graphics, vol. 32, No. 6 [retrieved Mar. 20, 2023]. Retrieved from the Internet <https://core.ac.uk/download/pdf/51954758.pdf>., Mar. 14, 2014, 12 Pages.

Filip, Jiří et al., "Bidirectional Texture Function Modeling: A State of the Art Survey", IEEE Transactions on Pattern Analysis and Machine Intelligence, vol. 31, No. 11 [retrieved Mar. 20, 2023]. Retrieved from the Internet <https://doi.org/10.1109/TPAMI.2008.246>., Oct. 17, 2008, 20 Pages.

Fridovich-Keil, Sara et al., "Plenoxels: Radiance Fields Without Neural Networks", Conference on Computer Vision and Pattern Recognition [retrieved Mar. 19, 2023]. Retrieved from the Internet <https://openaccess.thecvf.com/content/CVPR2022/papers/Fridovich-Keil_Plenoxels_Radiance_Fields_Without_Neural_Networks_CVPR_2022_paper.pdf>., Jun. 2022, 10 Pages.

Han, Charles et al., "Frequency Domain Normal Map Filtering", Proceedings of ACM SIGGRAPH 2007; vol. 26; Issue 3 [retrieved Mar. 20, 2023]. Retrieved from the Internet <https://web.archive.org/web/20160429152231id_/http://graphics.berkeley.edu/papers/Han-FDN-2007-07/Han-FDN-2007-07.pdf>., Jul. 2007, 11 pages.

Jakob, Wenzel et al., "Discrete stochastic microfacet models", ACM Transactions on Graphics, vol. 33, No. 4 [retrieved Mar. 20, 2023]. Retrieved from the Internet <https://web.archive.org/web/20150318132501id_/http://cseweb.ucsd.edu/~ravir/stochastic.pdf>., Jul. 27, 2014, 10 Pages.

Kajiya, et al., "Rendering Fur with Three Dimensional Textures", SIGGRAPH Computer Graphics 23, 3 [retrieved Mar. 19, 2023]. Retrieved from the Internet <http://www.crystalspace.ru/download/p271-kajiya.pdf>., Jul. 1989, 10 pages.

Kalantar, Nima Khademi et al., "A Machine Learning Approach for Filtering Monte Carlo Noise", ACM Transactions on Graphics, vol. 34, No. 4 [retrieved Mar. 19, 2023]. Retrieved from the Internet <https://cseweb.ucsd.edu/~ravir/274/15/papers/SIGGRAPH15_LBF_LoRes.pdf>., Jul. 27, 2015, 12 Pages.

Kallweit, Simon et al., "Deep Scattering: Rendering Atmospheric Clouds with Radiance-Predicting Neural Networks", Cornell University arXiv, arXiv.org [retrieved Mar. 19, 2023]. Retrieved from the Internet <https://arxiv.org/pdf/1709.05418.pdf>., Sep. 15, 2017, 11 Pages.

Kaneko, Tomomichi et al., "Detailed shape representation with parallax mapping", Proceedings of the ICAT [retrieved Mar. 20, 2023]. Retrieved from the Internet <http://page.mi.fu-berlin.de/block/htw-lehre/wise2015_2016/bel_und_rend/skripte/kaneko2001.pdf>., 2001, 4 Pages.

Kaplanyan, A. S. et al., "Filtering distributions of normals for shading antialiasing", HPG '16: Proceedings of High Performance Graphics [retrieved Mar. 20, 2023]. Retrieved from the Internet <https://research.nvidia.com/sites/default/files/pubs/2016-06_Filtering-Distributions-of/NDFFiltering.pdf>., Jun. 20, 2016, 12 Pages.

Khungurn, Pramook et al., "Azimuthal Scattering from Elliptical Hair Fibers", ACM Transactions on Graphics, vol. 36, No. 2 [retrieved Mar. 19, 2023]. Retrieved from the Internet <https://www.cs.cornell.edu/~pramook/papers/elliptical-hair.pdf>., Apr. 3, 2017, 23 Pages.

Khungurn, Pramook et al., "Fast rendering of fabric micro-appearance models under directional and spherical gaussian lights", ACM Transactions on Graphics, vol. 36, No. 6 [retrieved Mar. 22, 2023]. Retrieved from the Internet <https://dl.acm.org/doi/pdf/10.1145/3130800.3130829>., Nov. 20, 2017, 15 Pages.

Koudelka, Melissa L. et al., "Acquisition, Compression, and Synthesis of Bidirectional Texture Functions", The 3rd international

(56)                    References Cited

OTHER PUBLICATIONS workshop on texture analysis and synthesis [retrieved Mar. 20, 2023]. Retrieved from the Internet <https://vision.cornell.edu/se3/wp-content/uploads/2014/09/texture03.pdf>., 2003, 5 Pages.

Kuznetsov, Alexandr et al., "NeuMIP: Multi-Resolution Neural Materials", Cornell University arXiv, arXiv.org [retrieved Mar. 19, 2023]. Retrieved from the Internet <https://arxiv.org/pdf/2104.02789.pdf>., Apr. 6, 2021, 12 Pages.

Kuznetsov, Alexandr et al., "Rendering Neural Materials on Curved Surfaces", SIGGRAPH '22 Conference Proceedings [retrieved Mar. 19, 2023]. Retrieved from the Internet <https://dl.acm.org/doi/pdf/10.1145/3528233.3530721>., Aug. 7, 2022, 9 Pages.

Kuznetsov, Alexandra , "Learning Generative Models for Rendering Specular Microgeometry", ACM Trans. Graph vol. 38, No. 6 [retrieved Mar. 20, 2023]. Retrieved from the Internet <https://people.engr.tamu.edu/nimak/Data/SIGASIA19_Glints_LoRes.pdf>., Nov. 8, 2019, 14 Pages.

Lokovic, Tom et al., "Deep shadow maps", Proceedings of the 27th annual conference on Computer graphics and interactive techniques [retrieved Mar. 19, 2023]. Retrieved from the Internet <https://citeseerx.ist.psu.edu/document?repid=rep1&type=pdf&doi=8535f115e45c2c576efc006cad96020cb547ce8c>., Jul. 1, 2000, 8 Pages.

Marschner, Stephen R. et al., "Light Scattering from Human Hair Fibers", ACM SIGGRAPH 2003 Papers [retrieved Mar. 19, 2023]. Retrieved from the Internet <https://citeseerx.ist.psu.edu/document?repid=rep1&type=pdf&doi=1526a3dbf03c8fdfe43cef742365beb37a6fe1ae>., Jul. 27, 2003, 12 pages.

Maximov, Maxim et al., "Deep Appearance Maps", Proceedings of the IEEE/CVF International Conference on Computer Vision [retrieved Mar. 22, 2023]. Retrieved from the Internet <https://openaccess.thecvf.com/content_ICCV_2019/papers/Maximov_Deep_Appearance_Maps_ICCV_2019_paper.pdf>., Oct. 2019, 10 Pages.

Mildenhall, Ben et al., "NeRF: Representing Scenes as Neural Radiance Fields for View Synthesis", Cornell University arXiv, arXiv.org [retrieved Mar. 19, 2023]. Retrieved from the Internet <https://arxiv.org/pdf/2003.08934.pdf>., Aug. 3, 2020, 25 Pages.

Moon, Jonathan T. et al., "Efficient multiple scattering in hair using spherical harmonics", SIGGRAPH '08: ACM SIGGRAPH 2008 papers [retrieved Mar. 19, 2023]. Retrieved from the Internet <https://citeseerx.ist.psu.edu/document?repid=rep1&type=pdf&doi=1ffadc89cf6d0836bac3ca6dbd2d8c5a0e750d41>., Aug. 1, 2008, 7 Pages.

Moon, Jonathan T. et al., "Simulating multiple scattering in hair using a photon mapping approach", ACM Transactions on Graphics, vol. 25, No. 3 [retrieved Mar. 19, 2023]. Retrieved from the Internet <https://citeseerx.ist.psu.edu/document?repid=rep1&type=pdf&doi=aff6b7d3d0046b67de92466e0aae01d0c3f13120>., Jul. 1, 2006, 8 Pages.

Muller, , "Compression and Real-Time Rendering of Measured BTFs Using Local PCA", Proceedings of the Vision, Modeling, and Visualization Conference [retrieved Mar. 22, 2023]. Retrieved from the Internet <http://www.gero-mueller.de/mueller-2003-compression.pdf>., Nov. 2003, 9 Pages.

Müller, Thomas et al., "Instant Neural Graphics Primitives with a Multiresolution Hash Encoding", Cornell University arXiv, arXiv.org [retrieved Mar. 19, 2023]. Retrieved from the Internet <https://arxiv.org/pdf/2201.05989.pdf>., May 4, 2022, 15 Pages.

Müller, Thomas et al., "Neural Control Variates", Cornell University arXiv, arXiv.org [retrieved Mar. 22, 2023]. Retrieved from the Internet <https://arxiv.org/pdf/2006.01524.pdf>., Sep. 4, 2020, 19 Pages.

Müller, Thomas et al., "Neural Importance Sampling", Cornell University arXiv, arXiv.org [retrieved Mar. 22, 2023]. Retrieved from the Internet <https://arxiv.org/pdf/1808.03856.pdf>., Sep. 3, 2019, 19 Pages.

Nalbach, Oliver et al., "Deep Shading: Convolutional Neural Networks for Screen-Space Shading", Cornell University arXiv, arXiv.

org [retrieved Mar. 22, 2023]. Retrieved from the Internet <https://arxiv.org/pdf/1603.06078.pdf>., Aug. 3, 2016, 12 Pages.

Olano, Marc et al., "LEAN mapping", ACM SIGGRAPH symposium on Interactive 3D Graphics and Games [retrieved Mar. 22, 2023]. Retrieved from the Internet <https://citeseerx.ist.psu.edu/document?repid=rep1&type=pdf&doi=30bc6c8b01008003ab49eefea77ae651ab6a8156>., Feb. 19, 2010, 8 Pages.

Oliveira, Manuel M. et al., "An Efficient Representation for Surface Details", UFRGS Technical Report [retrieved Mar. 22, 2023]. Retrieved from the Internet <https://www.inf.ufrgs.br/~oliveira/pubs_files/Oliveira_Policarpo_RP-351_Jan_2005.pdf>., Jan. 6, 2005, 9 Pages.

Pharr, Matt et al., "pbrt-v3", GitHub, Inc, uploaded by mmp [retrieved Mar. 22, 2023]. Retrieved from the Internet <https://github.com/mmp/pbrt-v3/>., 2015, 4 Pages.

Rainer, Gilles et al., "Neural BTF Compression and Interpolation", Computer Graphics Forum, vol. 38, No. 2 [retrieved Mar. 19, 2023]. Retrieved from the Internet <https://reality.tf.fau.de/projects/btf/rainer19neural-lowres.pdf>., Jun. 7, 2019, 10 Pages.

Rainer, Gilles et al., "Unified Neural Encoding of BTFs", Computer Graphics Forum, vol. 39, No. 2 [retrieved Mar. 22, 2023]. Retrieved from the Internet <https://spiral.imperial.ac.uk/bitstream/10044/1/79317/2/unifiedBTF-lowres.pdf>., May 2020, 12 Pages.

Rematas, Konstantinos et al., "Deep Reflectance Maps", IEEE Conference on Computer Vision and Pattern Recognition [retrieved Mar. 22, 2023]. Retrieved from the Internet <https://openaccess.thecvf.com/content_cvpr_2016/papers/Rematas_Deep_Reflectance_Maps_CVPR_2016_paper.pdf>., Jun. 2016, 9 Pages.

Ren, Peiran et al., "Global illumination with radiance regression functions", ACM Transactions on Graphics, vol. 32, No. 4 [retrieved Mar. 19, 2023]. Retrieved from the Internet <https://doi.org/10.1145/2461912.2462009>., Jul. 21, 2013, 12 Pages.

Ren, Peiran et al., "Image based relighting using neural networks", ACM Transactions on Graphics, vol. 34, No. 4 [retrieved Mar. 22, 2023]. Retrieved from the Internet <https://cseweb.ucsd.edu/~viscomp/classes/cse274/wi18/papers/a111-ren.pdf>., Jul. 27, 2015, 12 Pages.

Ren, Zhong , "Interactive hair rendering under environment lighting", SIGGRAPH '10: ACM SIGGRAPH 2010 papers [retrieved Mar. 19, 2023]. Retrieved from the Internet <https://citeseerx.ist.psu.edu/document?repid=rep1&type=pdf&doi=020a24baacab6241a62535753ef03023c15a5f0f>., Jul. 26, 2010, 8 Pages.

Rosu, Radu Alexandru et al., "Neural Strands: Learning Hair Geometry and Appearance from Multi-View Images", Cornell University arXiv, arXiv.org [retrieved Mar. 19, 2023]. Retrieved from the Internet <https://arxiv.org/pdf/2207.14067.pdf>., Jul. 28, 2022, 17 Pages.

Thies, Justus et al., "Deferred neural rendering: Image synthesis using neural textures", Cornell University arXiv, arXiv.org [retrieved Mar. 22, 2023]. Retrieved from the Internet <https://arxiv.org/pdf/1904.12356.pdf>., Apr. 28, 2019, 12 Pages.

Vicini, Delio et al., "A learned shape-adaptive subsurface scattering model", ACM Transactions on Graphics, vol. 38, No. 4 [retrieved Mar. 19, 2023]. Retrieved from the Internet <https://rgl.s3.eu-central-1.amazonaws.com/media/papers/Vicini2019Learned_1.pdf>., Jul. 12, 2019, 15 Pages.

Vogels, Thijs et al., "Denoising with kernel prediction and asymmetric loss functions", ACM Transactions on Graphics, vol. 37, No. 4 [retrieved Mar. 19, 2023]. Retrieved from the Internet <https://graphics.pixar.com/library/MLDenoising2018/paper.pdf>., Jul. 30, 2018, 15 Pages.

Wang, Beibei et al., "Path cuts: efficient rendering of pure specular light transport", ACM Transactions on Graphics, vol. 39, No. 6 [retrieved Mar. 19, 2023]. Retrieved from the Internet <https://sites.cs.ucsb.edu/~lingqi/publications/paper_pathcuts.pdf>., Nov. 27, 2020, 12 Pages.

Wang, Jiaping et al., "Capturing and rendering geometry details for BTF-mapped surfaces", The Visual Computer, vol. 21 [retrieved Mar. 22, 2023]. Retrieved from the Internet <http://jiapingwang.com/files/mdf05_final.pdf>., Sep. 2005, 9 Pages.

Weinmann, Michael et al., "Material Classification Based on Training Data Synthesized Using a BTF Database", Institute of Computer

(56)                    References Cited

OTHER PUBLICATIONS

Science, University of Bonn [retrieved Mar. 22, 2023]. Retrieved from the Internet <http://www.ipb.uni-bonn.de/projects/MoD/literatur/pdf/jgall_materialBTF_eccv14.pdf>., 2014, 16 Pages.
Williams, Lance , "Pyramidal Parametrics", Computer Graphics, vol. 17, No. 3 [retrieved Mar. 22, 2023]. Retrieved from the Internet <https://www.intel.com/content/dam/develop/external/us/en/documents/p1-williams-144947.pdf>., Jul. 1983, 11 pages.
Wu, Kui et al., "Real-time fiber-level cloth rendering", I3D '17: Proceedings of the 21st ACM SIGGRAPH Symposium on Interactive 3D Graphics and Games [retrieved Mar. 19, 2023]. Retrieved from the Internet <https://doi.org/10.1145/3023368.3023372>., Feb. 25, 2017, 8 Pages.
Wu, Lifan , "Accurate appearance preserving prefiltering for rendering displacement-mapped surfaces", ACM Transactions on Graphics, vol. 38, No. 4 [retrieved Mar. 22, 2023]. Retrieved from the Internet <https://par.nsf.gov/servlets/purl/10148553>., Jul. 12, 2019, 14 Pages.
Xu, Kun et al., "Interactive hair rendering and appearance editing under environment lighting", ACM Transactions on Graphics, vol. 30, No. 6 [retrieved Mar. 19, 2023]. Retrieved from the Internet <http://graphics.cs.umass.edu/pubs/sa11_hair.pdf>., Dec. 12, 2011, 10 Pages.
Yan, Ling-Qi et al., "A BSSRDF model for efficient rendering of fur with global illumination", ACM Transactions on Graphics, vol. 36, No. 6 [retrieved Mar. 22, 2023]. Retrieved from the Internet <https://dl.acm.org/doi/pdf/10.1145/3130800.3130802>., Nov. 20, 2017, 13 Pages.
Yan, Ling-Qi , "Physically-accurate fur reflectance: modeling, measurement and rendering", ACM Transactions on Graphics, vol. 34, No. 6 [retrieved Mar. 19, 2023]. Retrieved from the Internet <https://web.archive.org/web/20170225025036id_/http://graphics.ucsd.edu/~henrik/papers/paper_fur.pdf>., Nov. 2, 2015, 13 Pages.
Zhao, Shuang et al., "Downsampling scattering parameters for rendering anisotropic media", ACM Transactions on Graphics, vol. 35, No. 6 [retrieved Mar. 22, 2023]. Retrieved from the Internet <https://shuangz.com/projects/multires-sa16/multires-sa16-lowres.pdf>., Dec. 5, 2016, 11 Pages.
Zhao, Shuang et al., "Fitting procedural yarn models for realistic cloth rendering", ACM Transactions on Graphics, vol. 35, No. 4 [retrieved Mar. 19, 2023]. Retrieved from the Internet <https://escholarship.org/content/qt2fw2w3gs/qt2fw2w3gs_noSplash_2fdebde167045646e6a63ba5d08aedaf.pdf>., Jul. 11, 2016, 11 Pages.
Zhao, Shuang et al., "Modular flux transfer: efficient rendering of high-resolution volumes with repeated structures", ACM Transactions on Graphics, vol. 32, No. 4 [retrieved Mar. 19, 2023]. Retrieved from the Internet <https://web.archive.org/web/20150318125313id_/http://cseweb.ucsd.edu/~ravir/mft-sg13.pdf>., Jul. 21, 2013, 11 Pages.
Zhu, Junqiu , "Neural complex luminaires: representation and rendering", ACM Transactions on Graphics, vol. 40, No. 4 [retrieved Mar. 19, 2023]. Retrieved from the Internet <https://sites.cs.ucsb.edu/~lingqi/publications/paper_complum.pdf>., Jul. 19, 2021, 12 Pages.
Belcour, Laurent , "Efficient Rendering of Layered Materials using an Atomic Decomposition with Statistical Operators", ACM Transactions on Graphics, 2018, 37 (4) [retrieved Nov. 17, 2023]. Retrieved from the Internet <, Aug. 2018, 15 pages.
Donner, Craig , et al., "A Layered, Heterogeneous Reflectance Model for Acquiring and Rendering Human Skin", ACM Transactions on Graphics, vol. 27, No. 5 [retrieved Dec. 11, 2023]. Retrieved from the Internet <https://doi.org/10.1145/1409060.1409093>, Dec. 1, 2008, 12 pages.
Donner, Craig , et al., "A spectral BSSRDF for Shading Human Skin", EGSR '06: Proceedings of the 17th Eurographics conference on Rendering Techniques [retrieved Dec. 11, 2023]. Retrieved from the Internet <https://dl.acm.org/doi/abs/10.5555/2383894.2383946>, Jun. 2006, 10 pages.
Guo, Yu, et al., "Position-free monte carlo simulation for arbitrary layered BSDFs", ACM Transactions on Graphics, vol. 37, No. 6 [retrieved Dec. 11, 2023]. Retrieved from the Internet <https://doi.org/10.1145/3272127.3275053>, Dec. 4, 2018, 14 pages.
Guo, Jie , et al., "Rendering Thin Transparent Layers with Extended Normal Distribution Functions", IEEE Transactions on Visualization and Computer Graphics, vol. 23, No. 9 [retrieved Dec. 11, 2023]. Retrieved from the Internet <https://doi.org/10.1109/TVCG.2016.2617872>, Sep. 1, 2017, 12 pages.
Habel, Ralf , et al., "Photon Beam Diffusion: A Hybrid Monte Carlo Method for Subsurface Scattering", Computer Graphics Forum, vol. 32, No. 4 [retrieved Dec. 11, 2023]. Retrieved from the Internet <https://doi.org/10.1111/cgf.12148>, Jul. 18, 2013, 11 pages.
Jensen, Henrik Wann, et al., "A practical model for subsurface light transport", Seminal Graphics Papers: Pushing the Boundaries, vol. 2 [retrieved Dec. 18, 2023]. Retrieved from the Internet <https://doi.org/10.1145/3596711.3596747>, Aug. 2023, 8 pages.
Meng, Johannes , et al., "Multi-Scale Modeling and Rendering of Granular Materials", ACM Transactions on Graphics, vol. 34, No. 4 [retrieved Dec. 18, 2023]. Retrieved from the Internet <https://doi.org/10.1145/2766949>, Jul. 27, 2015, 13 pages.
Müller, Thomas , et al., "Efficient rendering of heterogeneous polydisperse granular media", ACM Transactions on Graphics, vol. 35, No. 6 [retrieved Dec. 29, 2023]. Retrieved from the Internet <https://doi.org/10.1145/2980179.2982429>, Dec. 5, 2016, 14 pages.
Mullia Lakshminarayana, Krishna Bhargava , et al., "Pursuant to MPEP § 2001.06(b) the applicant brings the following co-pending application to the Examiner's attention:", U.S. Appl. No. 18/499,593, filed Nov. 1, 2023, 67 pages.
Sun, Cheng , et al., "Neural-PBIR Reconstruction of Shape, Material, and Illumination", Proceedings of the IEEE/CVF International Conference on Computer Vision (ICCV) [retrieved Dec. 18, 2023]., Apr. 26, 2023, 11 pages.
Thonat, Theo , et al., "Tessellation-free displacement mapping for ray tracing", ACM Transactions on Graphics, vol. 40, No. 6 [retrieved Dec. 29, 2023]. Retrieved from the Internet <https://doi.org/10.1145/3478513.3480535>, Dec. 10, 2021, 16 pages.
Zhang, Cheng , et al., "Multi-Scale Appearance Modeling of Granular Materials with Continuously Varying Grain Properties", Eurographics Symposium on Rendering (DL-only Track) [retrieved Dec. 29, 2023]. Retrieved from the Internet <https://www.shuangz.com/projects/stocmed-egsr20/stocmed-egsr20-Id.pdf>, 2020, 13 pages.
Zinke, Arno , et al., "Dual scattering approximation for fast multiple scattering in hair", SIGGRAPH '08: ACM SIGGRAPH 2008 papers, Article No. 32 [retrieved Dec. 29, 2023]. Retrieved from the Internet <https://doi.org/10.1145/1399504.1360631>, Aug. 2008, 10 pages.
"Non-Final Office Action", U.S. Appl. No. 18/499,593, filed Jul. 8, 2025, 22 pages.
Gupta, et al., "3DGen: Triplane Latent Diffusion for Textured Mesh Generation", arXiv preprint, Cornell University, Mar. 2023, 10 pages.
Pharr, et al., "Physically Based Rendering: From Theory to Implementation", 2nd Edition. [retrieved on Jul. 3, 2025] Retrieved from the Internet, <https://www.sciencedirect.com/science/article/pii/B9780123750792500019>, Chapter 1, 2010, 52 pages.
Zheng, et al., "A Self-Occlusion Aware Lighting Model for Real-Time Dynamic Reconstruction", IEEE Transactions on Visualization and Computer Graphics, vol. 29, No. 10, May 2022, 12 pages.
Final Office Action issued in U.S. Appl. No. 18/499,593, mailed Dec. 12, 2025, 29 pages.
Rainer et al., "Neural Precomputed Radiance Transfer," Computer Graphics Forum, vol. 41, No. 2, May 24, 2022, pp. 365-378.

* cited by examiner

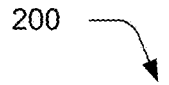
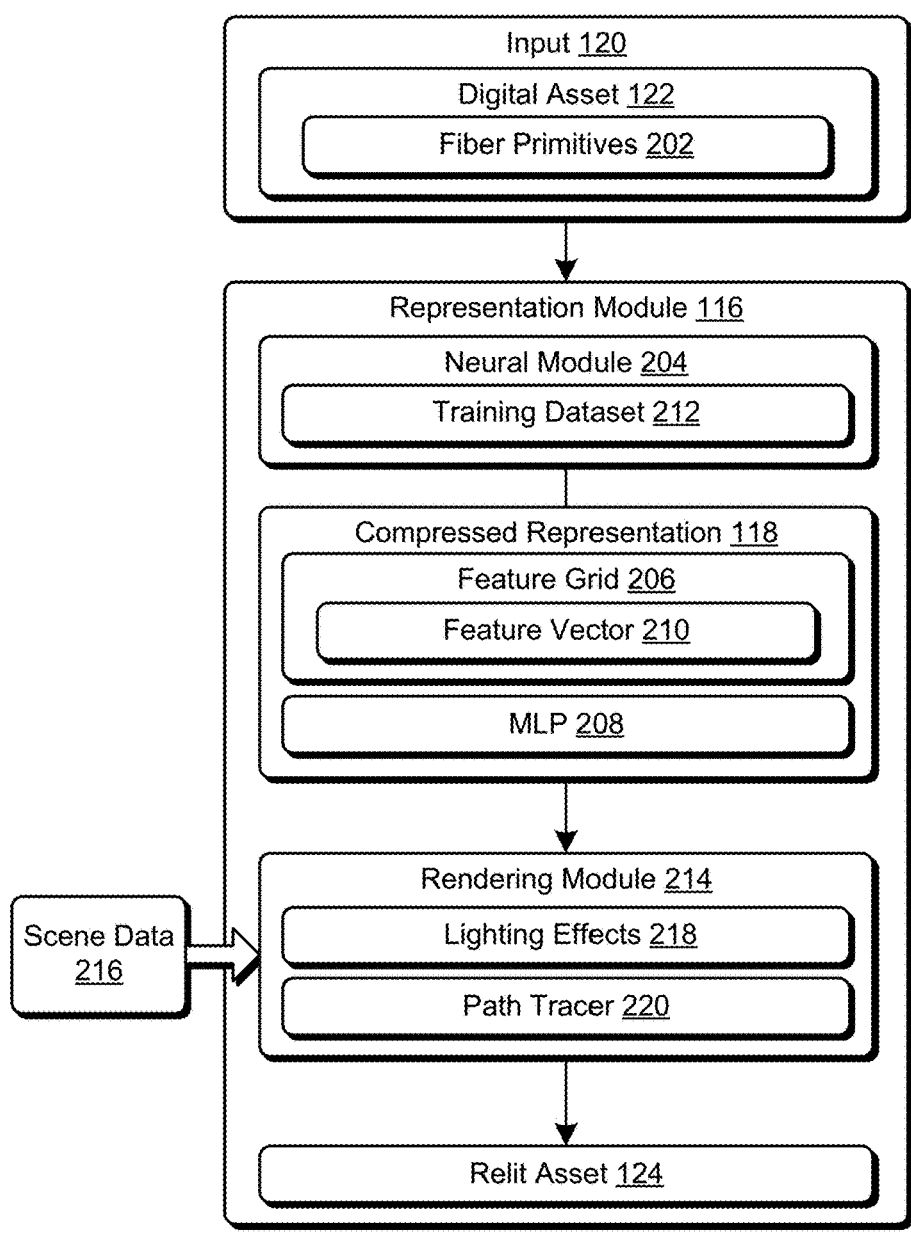
200
Input 120
Digital Asset 122
Fiber Primitives 202
Representation Module 116
Neural Module 204
Training Dataset 212
Compressed Representation 118
Feature Grid 206
Feature Vector 210
MLP 208
Rendering Module 214
Scene Data 216
Lighting Effects 218
Path Tracer 220
Relit Asset 124
Fig. 2

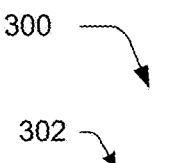
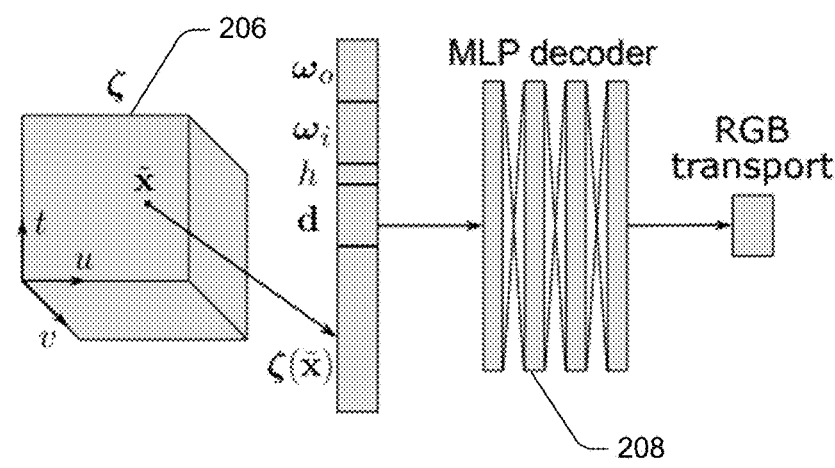
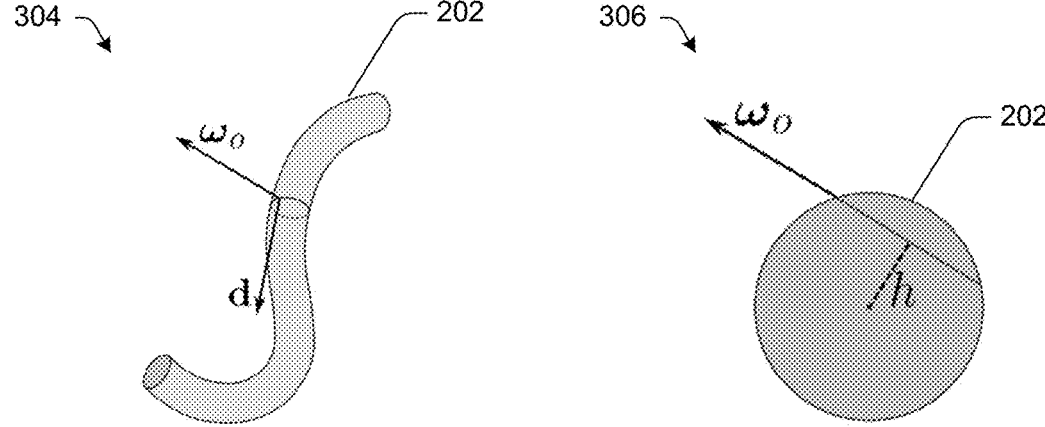
*Fig. 3*

502   504   506
508   510   512
514   516   518

700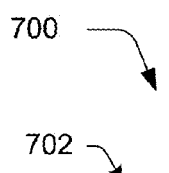
702
Relit Compressed
Representation
Reference Image
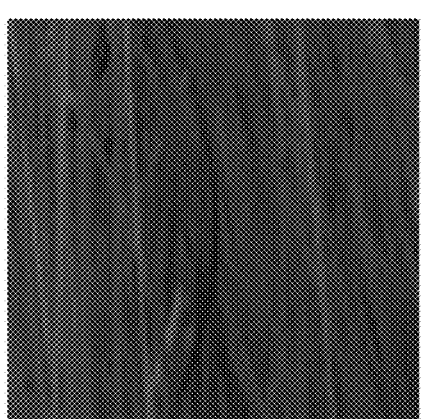 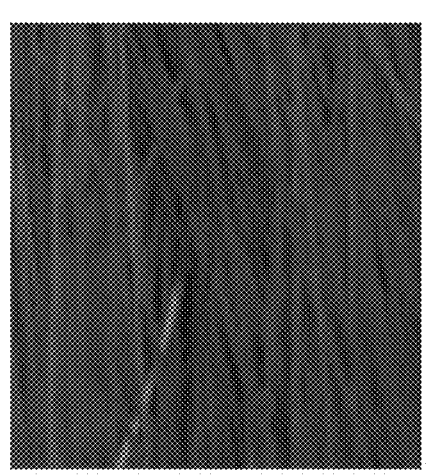
704
Relit Compressed
Representation
Reference Image
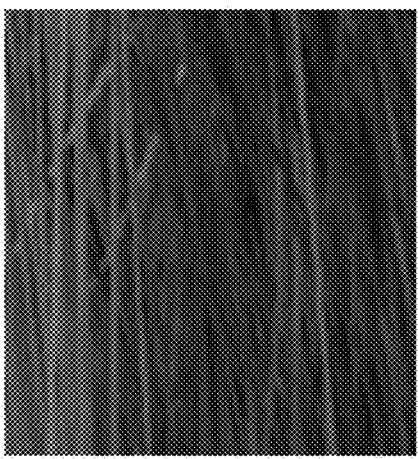 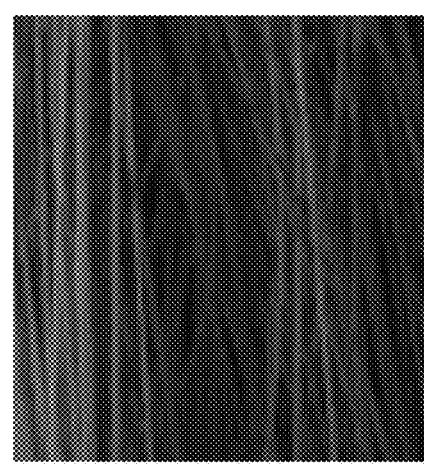
*Fig. 7*

800
802
Local Area Light
804
Local Point Light
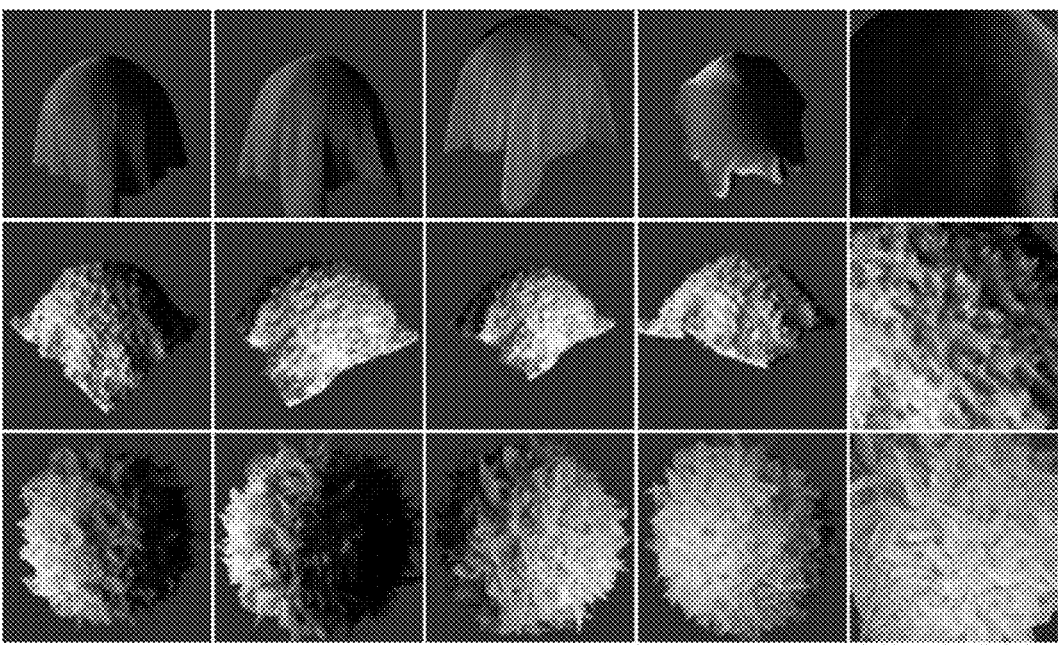
*Fig. 8*

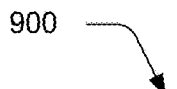

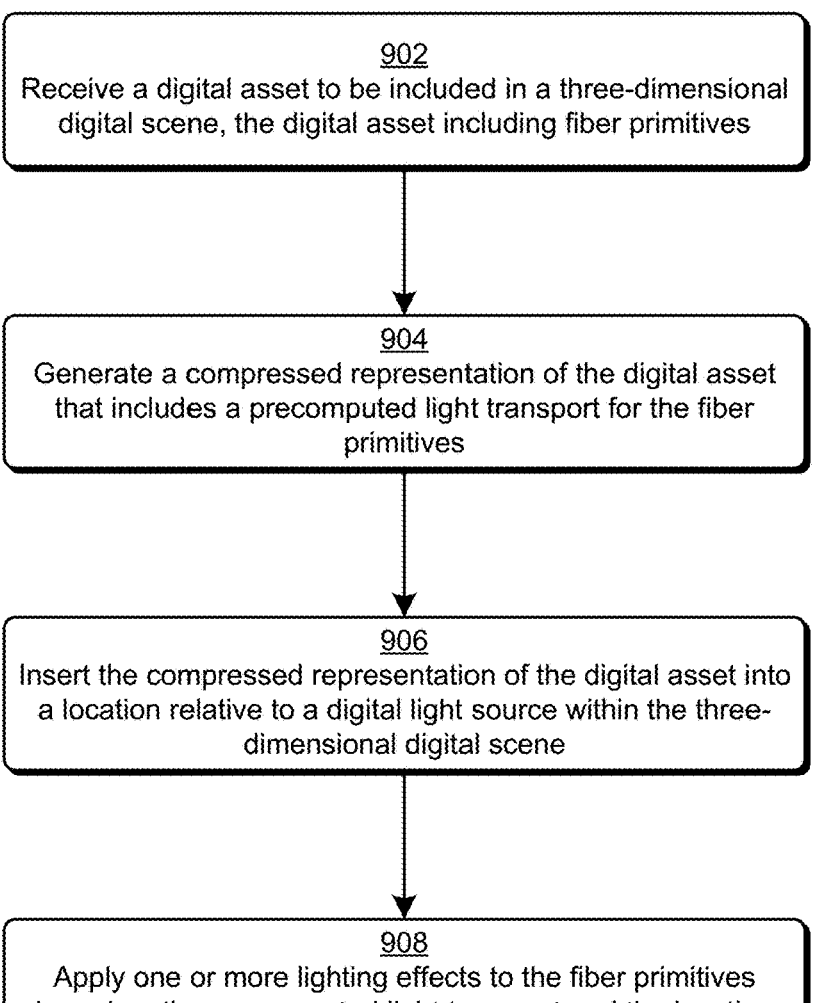

900

902
Receive a digital asset to be included in a three-dimensional digital scene, the digital asset including fiber primitives

904
Generate a compressed representation of the digital asset that includes a precomputed light transport for the fiber primitives

906
Insert the compressed representation of the digital asset into a location relative to a digital light source within the three-dimensional digital scene

908
Apply one or more lighting effects to the fiber primitives based on the precomputed light transport and the location relative to the digital light source

*Fig. 9*

1000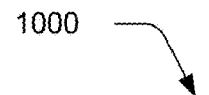
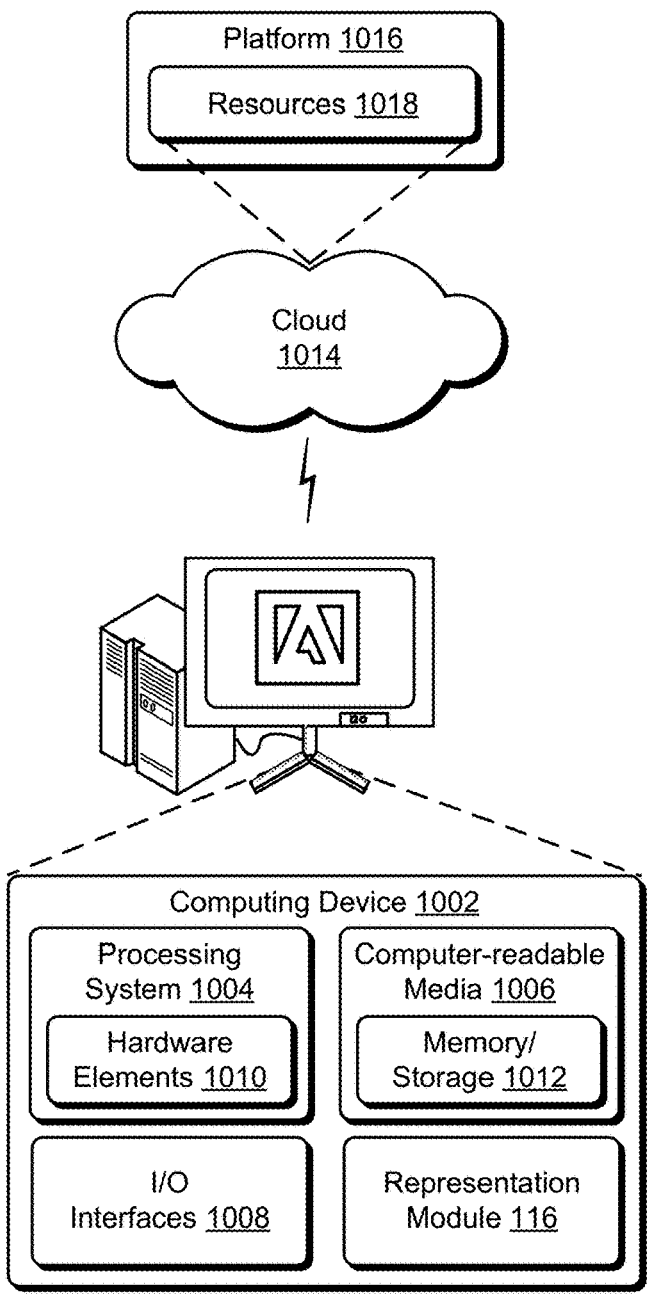
*Fig. 10*

COMPRESSED REPRESENTATIONS FOR APPEARANCE OF FIBER-BASED DIGITAL ASSETS

BACKGROUND

Computer graphics techniques model digital objects in a variety of ways to generate realistic representations of the digital objects in a digital environment. For example, a three-dimensional digital scene includes several digital objects and light sources that are viewable from various perspectives. To simulate the behavior of light in the digital scene, conventional approaches employ path tracing techniques and algorithms to trace individual light rays as they interact with objects and surfaces in the digital scene. However, such interactions are exceedingly complex, and thus conventional path tracing techniques struggle to efficiently generate high fidelity representations of digital objects with complex geometries. Accordingly, conventional techniques to render digital objects are computationally expensive and are often not suitable for real-time applications such as interactive games or virtual reality.

SUMMARY

Techniques for generation of compressed representations for appearance of fiber-based digital assets are described that precompute a light transport for a digital asset to support lighting effects with reduced consumption of computational resources. In an example, a processing device implements a content processing system to receive a digital asset that includes fiber primitives to be included in a three-dimensional digital scene. The content processing system generates a compressed representation of the digital asset that maintains a geometry of the digital asset and includes a precomputed light transport that represents how light interacts with and/or propagates through the fiber primitives. The compressed representation, for instance, is a neural representation of the digital asset that includes a trained feature grid and multilayer perceptron (MLP) that are configured to support shading operations, e.g., relighting under a variety of lighting conditions and view directions.

Accordingly, the content processing system inserts the compressed representation into the digital scene, such as in a location relative to one or more light sources. The content processing system applies one or more lighting effects to the compressed representation based on the precomputed light transport, such as to relight the compressed representation based on the location relative to the one or more light sources. In this way, the techniques described herein conserve computational resources while performing high fidelity lighting operations.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. Entities represented in the figures are indicative of one or more entities and thus reference is made interchangeably to single or plural forms of the entities in the discussion.

FIG. 2 depicts a system in an example implementation showing operation of a representation module in greater detail.

FIG. 3 depicts an example of generation of compressed representations for fiber-based digital assets.

FIG. 7 depicts an example of high-fidelity renderings of fiber assets generated in accordance with the techniques described herein.

FIG. 8 depicts an additional example of generation of relightable fiber assets based on a compressed representation for various asset types and lighting conditions.

FIG. 9 is a flow diagram depicting an algorithm as a step-by-step procedure in an example implementation that is performable by a processing device to generate a compressed representation based on a digital asset.

FIG. 10 illustrates an example system including various components of an example device that can be implemented as any type of computing device as described and/or utilized with reference to FIGS. 1-9 to implement embodiments of the techniques described herein.

DETAILED DESCRIPTION

Overview

Figure 1:
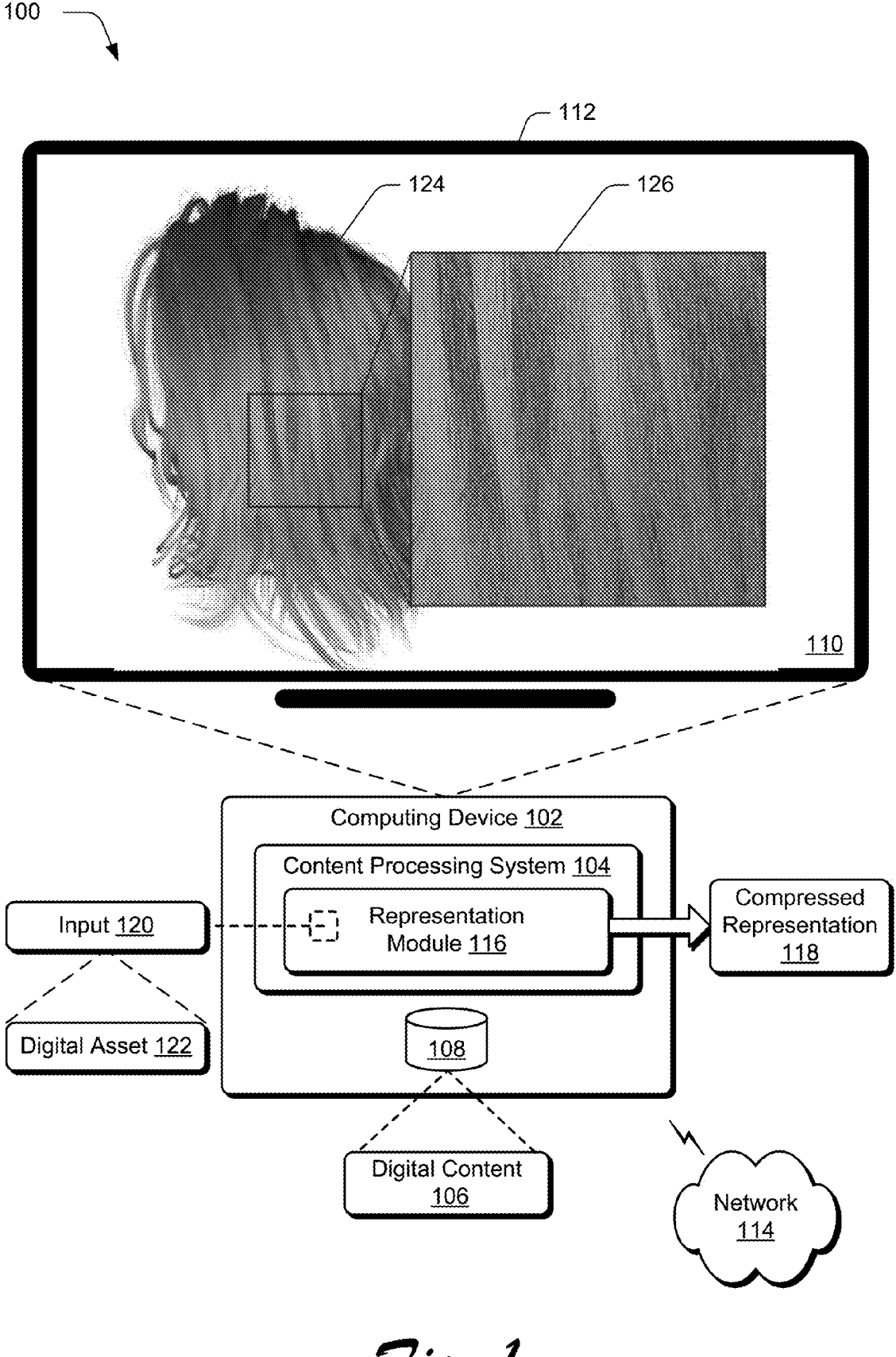
FIG. 1 is an illustration of a digital medium environment in an example implementation that is operable to employ the compressed representations for appearance of fiber-based digital assets techniques described herein.

Path tracing is a rendering technique used in computer graphics that attempts to simulate the behavior of light in a digital scene. For instance, conventional path tracing techniques trace light rays from a virtual camera into a digital scene and accumulate information about an amount of light that the rays encounter as they propagate throughout the digital scene. For instance, as the rays propagate, they interact with digital objects that have a variety of surface properties and are reflected, refracted, absorbed, transmitted, scattered, emitted, etc. Path tracing techniques model these interactions of the rays with the various surfaces and materials within the scene and estimate the overall lighting and illumination of the scene. Conventional path tracing techniques often employ Monte Carlo methods that randomly sample a number of paths of light rays per pixel to estimate the contribution of each ray to a final pixel color.

However, due to the number of interactions and the length of the rays, the complexity of the path tracing algorithms, and the number of samples that Monte Carlo methods rely on, conventional path tracing techniques are computationally expensive. Thus, implementation of such techniques are limited to specialized processing devices with sufficient processing power. Further, due to the high rendering time, conventional path tracing approaches are often not suitable for real-time applications such as interactive games or virtual reality/augmented reality, particularly with digital scenes that include digital objects with complex geometries such as fiber-based digital assets.

Accordingly, several approaches have been proposed to reduce the computational overhead of path tracing techniques, such as by reducing a number of light interactions and/or leveraging a simplified shading model. However, these techniques sacrifice visual quality, which results in unrealistic and/or low-quality renderings. Other conventional approaches support novel view synthesis and "bake" scene lighting into a digital object, however such objects cannot be relit, e.g., respond to a new lighting condition such as illumination of a new scene, which limits utility of such approaches.

Accordingly, techniques and systems to generate compressed representations for fiber-based digital assets are described. A compressed representation, for instance, represents a geometry of a fiber-based digital asset and includes a precomputed light transport. Thus, the compressed representation is insertable into a digital scene and is able to be relit to display a realistic visual appearance under a variety of lighting conditions and view angles/directions with reduced consumption of computational resources.

Consider an example in which a user designs a digital scene and desires to add a digital asset that represents a wig to the digital scene. The wig includes a plurality of fibers, such as hundreds of thousands of individual hairs. Accordingly, a conventional approach to render the digital asset includes simulating interactions of hundreds or thousands of rays per pixel with the hundreds of thousands of individual hairs. Further, the rays scatter and "bounce" off of individual hairs as they propagate throughout the scene, and conventional approaches calculate a complex light transport for each scattering interaction. Thus, conventional techniques are computationally expensive, and not practical for a variety of rendering scenarios. For instance, conventional path tracing techniques are not practical to implement by a variety of processing devices (e.g., mobile devices, tablets, laptops, etc.) and further are not suitable for real-time applications.

To overcome these limitations, a processing device implements a content processing system to generate compressed representations for fiber-based digital assets, which supports shading operations, e.g., relighting, under a variety of light and view conditions. To do so, the content processing system receives a digital asset to be included in a three-dimensional digital scene. Generally, the digital asset represents a three-dimensional geometry of a digital object and includes a plurality of fiber primitives that represent individual fibers of the digital asset. In this example, the digital asset models a geometry of the wig, and the fiber primitives represent the individual hairs of the wig.

The content processing system generates a compressed representation of the digital asset that includes a precomputed light transport for the fiber primitives. Generally, the light transport represents how light interacts with and/or propagates through the fiber primitives. For instance, the light transport models interactions (e.g., reflection, refraction, scattering, absorption, transmission, emission, etc.) of light with the individual hairs of the wig. However, iterative computation of the complex light transport during rendering, such as each time the digital scene changes, is computationally expensive which limits utility. To conserve computational resources during rendering, the content processing system precomputes the light transport and the compressed representation encodes the precomputed light transport into a neural network that includes a three-dimensional feature grid as well as a multilayer perceptron (MLP) decoder. In this way, the compressed representation is responsive to variation in view and lighting conditions without repeated calculation of the light transport.

To generate the compressed representation, the content processing system generates a training dataset based on the digital asset. The training dataset includes training images that depict the fiber-based asset from a variety of virtual camera locations (e.g., view angles and/or view directions) and under various lighting conditions. Further, the training dataset includes training data at a pixel level, e.g., training samples for each visible pixel within the training images. The training samples, for instance, are tuples that include one or more of a radiance value (e.g., an RGB value), an intersection point at which a primary ray (e.g., traced from a virtual camera) intersects with a particular fiber primitive, a fiber axis offset (e.g., a distance from a center of the particular fiber primitive to the intersection), a distance from the base of the particular fiber primitive to the intersection point, a view direction, and/or a light direction from one or more light sources in the digital scene.

Continuing with the above example, the content processing system generates a plurality of training images (e.g., four hundred) of the wig with variable view directions and/or lighting conditions. In this example, each of the training images is 1024×1024 pixels. For each pixel of the training images, the content processing system generates a training sample that includes a radiance value as a ground truth, as well as additional information as described above.

Using the training dataset, the content processing system trains the feature grid and the MLP of the compressed representation. For instance, the content processing system leverages the compressed representation to predict an outgoing radiance based on a training sample and compares the predicted radiance with the ground truth radiance to update various parameters and weights of the feature grid and the MLP. In various examples, the feature grid is a cube of data that is constructed in a three-dimensional UVT space aligned with the fiber primitives and is configured to be trilinearly interpolated. As further described below, the MLP is configured to receive a feature vector from the feature grid to generate a radiance value, e.g., an RGB color value.

Once generated, the content processing system inserts the compressed representation into the digital scene. The scene, for instance, includes one or more digital light sources and the compressed representation is positioned in a location relative to the one or more digital light sources. The content processing system then applies one or more lighting effects to the fiber primitives of the digital asset based on the precomputed light transport and the location relative to the one or more digital light sources. For instance, the lighting effect includes a shading operation to "relight" the compressed representation, such that the compressed representation is rendered to display a realistic appearance under lighting conditions of the scene.

Continuing with the above example, the compressed representation of the wig is inserted into the digital scene and rendered based on lighting conditions of the digital scene and the precomputed light transport. To relight the compressed representation, the content processing system leverages a path tracer and/or a rasterizer-based renderer. For instance, the content processing system utilizes a path tracer to determine intersection points of primary rays from a virtual camera that defines a view direction of the fiber primitives. The content processing system then queries the feature grid to extract feature vectors that correspond to the intersection points.

The feature vectors include a variety of information learned during training, and the content processing system further concatenates the feature vector with additional data from the digital scene such as the view direction, a light direction, a fiber direction, and a fiber axis offset. The trained MLP receives and evaluates the concatenated feature vectors to generate RGB values for pixels associated with the intersection points. The content processing system then applies the RGB values to the pixels to generate a photo-realistic rendering of the wig with accurate color and lighting simulation. The above process is repeated for changed conditions of the digital scene, such as a change in a position of the view direction and/or the wig, a changed condition of the light source such as intensity, location, type, etc. In this way, the techniques described herein support high fidelity lighting operations while conserving computational resources relative to conventional techniques.

Further discussion of these and other examples and advantages are included in the following sections and shown using corresponding figures. In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ the compressed representations for appearance of fiber-based digital assets techniques described herein. The illustrated environment 100 includes a computing device 102, which is configurable in a variety of ways.

The computing device 102, for instance, is configurable as a processing device such as a desktop computer, a laptop computer, a mobile device (e.g., assuming a handheld configuration such as a tablet or mobile phone), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 10.

The computing device 102 is illustrated as including a content processing system 104. The content processing system 104 is implemented at least partially in hardware of the computing device 102 to process and transform digital content 106, which is illustrated as maintained in storage 108 of the computing device 102. Such processing includes creation of the digital content 106, compression of the digital content 106, modification of the digital content 106, and rendering of the digital content 106 in a user interface 110 for output, e.g., by a display device 112. Although illustrated as implemented locally at the computing device 102, functionality of the content processing system 104 is also configurable in whole or in part via functionality available via the network 114, such as part of a web service or "in the cloud."

An example of functionality incorporated by the content processing system 104 to process the digital content 106 is illustrated as a representation module 116. The representation module 116 is configured to generate a compressed representation 118 based on an input 120 that includes a digital asset 122. Generally, the digital asset 122 represents a three-dimensional geometry of a digital object to be included in a digital scene. In the illustrated example, the digital asset 122 is a fiber-based asset, such as a representation of a head of blonde hair, that includes a plurality of fiber primitives to represent individual hairs. The representation module 116 is operable to generate a compressed representation 118 of the hair representation, which encodes a precomputed light transport within a neural model to support computationally efficient shading operations such as lighting and/or relighting.

To do so, the representation module 116 generates and leverages a training dataset based on the digital asset 122 to configure the compressed representation 118 to be responsive to a variety of light and view conditions. For instance, in the illustrated example the representation module 116 inserts the compressed representation 118 into the digital scene, which is displayed as a relit asset 124 by the display device 112. Because the compressed representation 118 includes the precomputed light transport, the representation module 116 renders the relit asset 124 with reduced consumption of computational resources relative to conventional techniques. Further, as shown by a zoomed in view 126, the compressed representation 118 maintains the original geometry of the digital asset 122 and thus the relit asset 124 depicts realistic fine details of the hair representation. This is not possible using conventional techniques that simplify geometry of digital assets at the expense of rendering quality. Further discussion of these and other advantages is included in the following sections and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Compressed Representations for Fiber-Based
Digital Assets

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-8 in parallel with procedure 900 of FIG. 9.

FIG. 2 depicts a system 200 in an example implementation showing operation of a representation module 116 in greater detail. Generally, the representation module 116 is operable to generate a compressed representation 118 of a digital asset 122, such as a fiber-based digital asset. In various examples, the representation module 116 inserts the compressed representation 118 into a digital scene to be rendered as a relit asset 124 such as to respond to illumination of the digital scene, as further described below.

For example, the representation module 116 is operable to receive a digital asset 122 to be included in a three-dimensional digital scene (block 902). The digital asset, for instance, represents a three-dimensional geometry of a digital object. The geometry is representable in a variety of ways, such as one or more procedural representations, parametric curves/surfaces, volumetric data, implicit surfaces, polygonal meshes, etc. As further described below, the digital scene depicts a digital environment and in various embodiments includes one or more digital objects, light sources, shadows, materials/textures, virtual cameras/points-of-view, backgrounds, visual effects, particle systems (e.g., smoke/fog simulations), etc.

In various examples, the digital asset 122 includes one or more fiber primitives 202. The fiber primitives 202 are usable to represent individual fibers included in the digital asset 122. Generally, the individual fibers represent fine strands and/or filaments of natural materials (e.g., hair strands, blades of grass, strands of materials such as cotton, wool, silk, etc.) and/or synthetic materials, e.g., strands/filaments of polyester, nylon, acrylic, carbon fiber, etc. The fiber primitives 202, for instance, are a data structure that encapsulates properties and attributes of the individual fibers. The fiber primitives 202 include information that defines characteristics of fibers, such as position, orientation, length, thickness, shape, color, material properties, etc. of the fibers.

Through inclusion and arrangement of the fiber primitives 202, the digital asset 122 realistically simulates geometry of a variety of structures and/or materials, such as hair, carpet, fur, grass, feathers, foliage, synthetic materials, whiskers, textiles, fabrics, granular media, etc. In one or more examples, the fibers of the digital asset are represented by a near-field hair shading model that defines a bidirectional scattering distribution function (BSDF) for points along the respective fibers such as described by Chiang, et al. *A Practical and Controllable Hair and Fur Model for Production Path Tracing*. Computer Graphics Forum (2016). This is by way of example and not limitation, and a variety of suitable fiber models are considered.

Traditional techniques to render fiber-based digital objects have limited utility due to the computational expense to render such complex assemblies. To overcome these limitations, the representation module 116 includes a neural module 204 that is operable to generate a compressed representation 118 of the digital asset 122 (block 904). Generally, the compressed representation 118 maintains the geometry of the digital asset 122 and includes a neural model to represent a precomputed light transport for the fiber primitives 202. The light transport represents how light interacts with and/or propagates through the fiber primitives 202 of the digital asset 122. For instance, the light transport models interactions of light rays with the fiber primitives 202 (e.g., reflection, refraction, scattering, absorption, transmission, emission, etc.) to determine an appearance of the digital asset 122 in a digital scene with one or more light sources.

The light transport considers a variety of factors to determine the appearance, such as features of the one or more light sources (e.g., intensity, color, position, type, movement, etc.), features of the digital asset 122 (e.g., material properties, fiber geometry, size, position, movement, etc.), viewing direction, interaction with other digital objects and/or participating media in the scene, shadows, occlusion, direct lighting, indirect lighting, global illumination, etc. By way of example, the light transport represents a scattering interaction of a light ray that interacts with one or more of the fiber primitives 202 in the digital scene.

Conventional techniques to determine an appearance of a digital object include inserting the digital object into a digital scene, and tracing individual rays within the digital scene as the rays interact with various digital objects. This includes determining effects of multiple scattering, e.g., an effect of rays bouncing off multiple surfaces. Accordingly, for fiber-based digital objects, conventional techniques involve determining a contribution of millions of interactions to a final pixel color which is computationally inefficient and not practical in a variety of scenarios. However, by precomputing the light transport the techniques described herein support generation of a compressed representation 118 that is able to be inserted into a digital scene and respond to lighting conditions to produce high-fidelity renderings in a computationally efficient manner.

To precompute the light transport, the compressed representation 118 includes a neural model that compresses the light transport for the digital asset 122. The compressed representation 118 precomputes the complex interactions of the light transport (e.g., shading, shadowing, scattering, etc.) such that the digital asset 122 is relightable without tracing scattering paths as in conventional approaches. For instance, a radiance (e.g., RGB color values) for a particular pixel of the digital asset 122 is determined by evaluating the compressed representation 118 based on an arbitrary view direction and lighting conditions as further described below.

In various implementations, the neural model of the compressed representation 118 includes a feature grid 206 and a multi-layer perceptron (MLP) 208. Generally, the feature grid 206 parameterizes a structure of the digital asset 122 such that discrete geometric locations of the digital asset 122 are indexed within a data cube. For instance, the neural module 204 constructs the feature grid 206 in a three-dimensional space aligned with the fiber primitives 202 to store various information about the digital asset 122. In various examples, the feature grid 206 is constructed to be trilinearly interpolated, such as to provide a continuous estimation of values within the three-dimensional space of the feature grid 206.

In one example, the feature grid 206 is defined by a UVT and/or UVW coordinate system, such that a U-axis and a V-axis represent a flattened structure of the digital asset 122, while the T-axis represents a "length" of one or more fiber primitives 202. For example, consider a digital asset 122 that represents a wig of human hair. The U-axis and the V-axis represent a flattened "scalp" while the T-axis represents a normalized length of hairs of the wig. Thus, a (u, v, t) coordinate represents a particular voxel of the feature grid 206 that corresponds to a point on the digital asset 122. The feature grid 206 is sampled at various coordinates to extract a feature vector 210, which is usable in subsequent rendering/shading operations as further described below.

Generally, the MLP 208 is a decoder that decodes and/or encodes the precomputed light transport. For instance, the MLP 208 is trained to receive the feature vector 210 along with additional information particular to the digital asset 122 and/or the digital scene, and generate a radiance value, e.g., an RGB value, based on the precomputed light transport. While in this example the decoder is a multilayer perceptron, a variety of suitable artificial neural networks are considered.

In an example, the neural module 204 generates the compressed representation 118 by jointly training the feature grid 206 and the MLP 208 using a training dataset 212. In this example, the feature grid 206 and the MLP 208 are trained to generate an outgoing radiance, e.g., an RGB color value, for pixels of the digital asset 122 based on a known view direction and light source. The training dataset 212 is based on training images depicting the digital asset 122 viewed from a plurality of different locations within the three-dimensional digital scene with a plurality of light source locations.

The training dataset 212 further includes training samples at a pixel level, e.g. one or more training samples for each pixel that depicts the digital asset 122 within the training images. By way of example, a training sample associated with a particular pixel is a tuple defined as $\{L_o, \tilde{x}_o, d, h, \omega_o, \omega_i\}$. In this example, $L_o$ represents an outgoing radiance, which is used as a ground truth during training. A shading position, such as an intersection point of a ray with a fiber primitive 202, is represented as $\tilde{x}_o$. In various examples, $\tilde{x}_o$ corresponds to a set of uvt-coordinates of the feature grid 206. Further, d represents a fiber direction, h represents a fiber axis offset (e.g., a distance from the center of a fiber that a ray intersects the fiber), $\omega_o$ represents a view direction defined by one or more view angles, and $\omega_i$ represents a light direction. In various examples, $\omega_o$ and $\omega_i$ are from a spherical and/or hemispherical domain. These variables are further described below in more detail with respect to FIG. 3.

In various implementations, the neural module 204 generates the training dataset 212 based on the digital asset 122. For instance, the neural module 204 generates a plurality of training images by inserting the digital asset 122 into a training scene with varying view directions and lighting conditions. The neural module 204 then generates one or more training samples (e.g., a tuple such as $\{L_o, \tilde{x}_o, d, h, \omega_o, \omega_i\}$) for each pixel of the training images. In one example, the neural module 204 generates four hundred training images with a resolution of 1024×1024 pixels and generates a training sample for each pixel. In some examples, the neural module 204 generates a plurality of rendered samples (e.g., between 64 and 256) for each pixel, and aggregates the rendered samples to generate a training sample for each pixel.

To generate the training samples, the neural module 204 models the fiber primitives 202 as curved cylinders attached to a scalp mesh, which provides uv-coordinates for each fiber primitive 202. In various examples, material properties of the fiber primitives 202 are defined based on a BSDF fiber shading model such as described by Chiang, et al. *A Practical and Controllable Hair and Fur Model for Production Path Tracing*. Computer Graphics Forum (2016). This is by way of example and not limitation, and a variety of suitable fiber shading models are considered.

The neural module 204 leverages a path tracer to determine an outgoing radiance, e.g. an RGB value, for each visible pixel within a particular training image. In various examples, the neural module 204 is operable to disable antialiasing of the path tracer such that primary rays are traced through a center of respective pixels. In this way, the outgoing radiance is determined for individual points of the fiber geometry, rather than as an average of multiple points. Further, in some examples the neural module 204 is operable to render each pixel with a plurality of lighting directions to enhance the size and diversity of the training dataset 212.

In various examples, the neural module 204 is further configured to output one or more arbitrary output variables (AOVs) during rendering, such as u, v, t, which denote a location of $\tilde{x}_o$, as well as a fiber axis offset h, and a fiber direction d. In additional or alternative examples, the neural module 204 determines that the lighting source includes a directional light. The neural module 204 then smooths the directional light using regularization techniques by transforming the directional light into a finite cone (e.g., with a radius of 2°-5°). In this way, the light source subtends a finite solid angle, which reduces artifacts for specular materials. Accordingly, the techniques described herein support generation of an expansive training dataset 212 that includes training data to represent a variety of view directions and lighting conditions of the digital asset 122.

The neural module 204 leverages the training dataset 212 to update the feature grid 206 and/or adjust weights of the MLP 208. For instance, the neural module 204 predicts an outgoing radiance based on a training sample and uses the ground truth radiance with an L2 error with log(x+1) to update the feature grid 206 and weights of the MLP 208. In one example, between the feature grid 206 and the MLP 208, the neural module 204 optimizes 16.8 million parameters. In this way, the neural module 204 configures the compressed representation 118 as a relightable neural asset, which is renderable under a variety of unseen illumination conditions and view directions.

Once generated, the representation module 116 includes a rendering module 214 that is operable to insert the compressed representation 118 of the digital asset 122 into the three-dimensional digital scene (block 906). For instance, the rendering module 214 inserts the compressed representation 118 into the digital scene at a location relative to one or more digital light sources. In one or more examples, the location is defined based on a set of three-dimensional coordinates. In some examples, the digital scene further includes one or more additional digital objects, shadows, materials/textures, virtual cameras/points-of-view, backgrounds, visual effects, particle systems (e.g., smoke/fog simulations), etc. that impact lighting conditions.

The rendering module 214 then applies one or more lighting effects 218 to the fiber primitives (block 908). The lighting effects 218, for instance, are based on the precomputed light transport and scene data 216 such as a view direction and/or the location of the compressed representation 118 within the digital scene relative to the digital light source. In some examples, the scene data 216 denotes a type of digital light source included in the digital scene, e.g., point light, area light, directional light, distant light, etc. In various implementations, the lighting effects 218 includes a shading operation to determine a visual appearance of the relit asset 124 based on various features of the digital scene. For example, a shading operation to relight the digital asset 122 includes application of color values to pixels of the compressed representation 118 to produce a realistic appearance based on the scene data 216. The rendering module 214 is thus operable to determine color values to apply to points along the fiber primitives 202 to impart realistic lighting effects 218.

In an example to do so, the rendering module 214 includes a renderer such as a rasterizer-based renderer to generate the relit asset 124. In an additional or alternative example to do so, the rendering module 214 leverages a path tracer 220 to trace primary rays from a virtual camera that defines a view direction to intersection points with the compressed representation 118. In various examples, the rendering module 214 jitters a direction of one or more of the primary rays within a respective pixel. The rendering module 214 then computes a color value to apply to a fiber primitive 202 at the intersection points based on the precomputed light transport.

For instance, the rendering module 214 queries the feature grid 206 at a uvt-coordinate that corresponds to an intersection point to obtain a feature vector 210. Generally, the feature vector 210 is a multidimensional representation that includes information about the digital asset 122. In various examples the feature vector 210 includes information (e.g., parameters and/or weights) learned during training. Further, the feature vector 210 is concatenated with additional information such as one or more of a view direction, a light direction, a fiber direction, and a fiber axis offset associated with the intersection point.

The rendering module 214 passes the feature vector 210 to the trained MLP 208, which evaluates the feature vector 210 to generate a radiance value, e.g., an RGB value. The rendering module 214 repeats this process for each intersection point of primary rays with the digital asset 122. Thus, the rendering module 214 determines a color value for each intersection point by querying the compressed representation 118. By determining a radiance value based on the first intersection of a ray with the digital asset 122, the rendering module 214 overcomes the limitations of computationally expensive conventional techniques that calculate multiple scattering paths for each ray. Accordingly, the techniques described herein support insertion of a compressed representation 118 a digital scene to produce high-fidelity and realistic renderings in a computationally efficient manner. Further, definition of the compressed representation 118 in such a way supports integration of the techniques described herein into a variety of existing rendering pipelines.

Example Implementations

FIG. 3 depicts an example 300 of generation of compressed representations for fiber-based digital assets in a first representation 302, a second representation 304 and a third representation 306. The first representation 302 depicts an example to generate a color value for a particular pixel using the compressed representation 118. In this example, an outgoing radiance $L_o$ (e.g., an RGB value) at a position $x_o$ with a viewing direction $\omega_o$ (e.g., a position of a virtual camera relative to the digital asset 122) is represented as an integral of the light transport from a variety of positions and a variety of incoming lighting directions:

$$L_o(x_o, \omega_o) = \int_{x_i \in \mathcal{A}, \omega_i \in \omega} L_i(x_i, \omega_i) T(x_o, \omega_o, x_i, \omega_i) dx_i d\omega_i$$

where $L_i$ represents an incoming radiance at a position $x_i$ with a lighting direction $\omega_i$, with respective domains $\mathcal{A}$ and $\Omega$. In this example, T is a transport function from $\{x_i, \omega_i\}$ to $\{x_o, \omega_o\}$ and is dependent on a geometry and material properties of the digital asset 122, as well as a multitude of variable length light paths. Evaluation of the light transport using conventional approaches is computationally expensive, particularly for complex geometries such as fiber-based digital assets.

Accordingly, the techniques described herein generate a compressed representation 118 that includes a precomputed light transport that can be inserted into a digital scene and accurately respond to a variety of lighting conditions with reduced computational resource consumption. For example, the neural module 204 defines an outgoing radiance $L_o$ for the compressed representation 118, represented in this example as $\mathcal{T}$, at a particular point x as:

$$L_o(x, \omega_o) = \int_{\omega_i \in \Omega} L_i(\omega_i) \mathcal{T}(x, \omega_o, \omega_i) d\omega_i$$

which is applicable to each point x within the fiber geometry of the digital asset 122. Thus, $\mathcal{T}$ (e.g., the compressed representation 118) is defined by removing a dependence on $x_i$ as:

$$\mathcal{T}(x, \omega_o \omega_i) = \int_{x_i \in \mathcal{A}} T(x_o, \omega_0, x_i, \omega_i) dx_i$$

In this example, $\mathcal{T}(x, \omega_o, \omega_i)$ represents a radiance leaving the point x in a direction $\omega_o$ when lit by a directional light source from the lighting direction $\omega_i$. In this way, the compressed representation 118 accounts for multiple scattering interactions.

The fiber primitives 202 in this example are modeled as curved cylinders as depicted in a second representation 304 of FIG. 3. A third representation 306 of FIG. 3 depicts a cross section of a fiber primitive 202 that intersects with a ray from a viewing direction $\omega_o$. The radiance (e.g., an RGB color value) at a surface point x depends on a set of surface properties: $\xi(x) = \{u, v, t, h, d\}$ where t is a normalized distance (e.g., from 0 to 1) from a base of a fiber primitive 202 to the point x.

Further, h represents a fiber axis offset relative to the viewing direction $\omega_o$ as illustrated in the third representation 306. In this example, h is normalized from $[-1, 1]$ and represents a distance from a center of the particular fiber primitive that the intersection occurs. Further, d represents a fiber direction at the point x as illustrated in the second representation 304. Inclusion of fiber direction d, for instance, accounts for different fiber types and/or shapes such as wavy hair, straight hair, curly hair, etc. Additionally, u and v represent a UV-parameterization of the fiber "roots." In an example in which the digital asset 122 depicts human hair, u and v represent a scalp parametrization that is parametrized from $[0, 1]$. Thus, the triple (u, v, t) represents a coordinate system x̃ in a three-dimensional volume aligned with the fiber primitives 202 that includes UV-coordinates to represent a "base" of a particular fiber primitive 202 and the t-coordinate to denote a point along the particular fiber primitive 202, e.g., between the base and a tip.

Accordingly, the feature grid 206 (represented in this example as $\zeta$) is defined on the coordinate system x̃. The neural module 204 extracts a multi-channel feature vector 210, depicted as $\zeta(\tilde{x})$ in the illustrated example, from the feature grid 206 using trilinear interpolation. The feature vector 210 further incorporates the view direction $\omega_o$, a light direction $\omega_i$, a fiber direction d, and a fiber axis offset h. The neural module 204 encodes $\mathcal{T}$, e.g., the compressed representation 118, to the MLP 208. The MLP 208 is thus operable to receive as input the feature vector 210, which is represented as $\{\omega_o, \omega_i, h, d, \zeta(\tilde{x})\}$, to return an RGB value for a particular pixel. The neural module 204 iterates this process to determine color values for each pixel associated with the compressed representation 118, such as to render a relit asset 124. In this way, the compressed representation 118 incorporates the three-dimensional geometry of the digital asset 122 with the feature grid 206 and the MLP 208 to be renderable under arbitrary light conditions and/or view directions.

Figure 4:
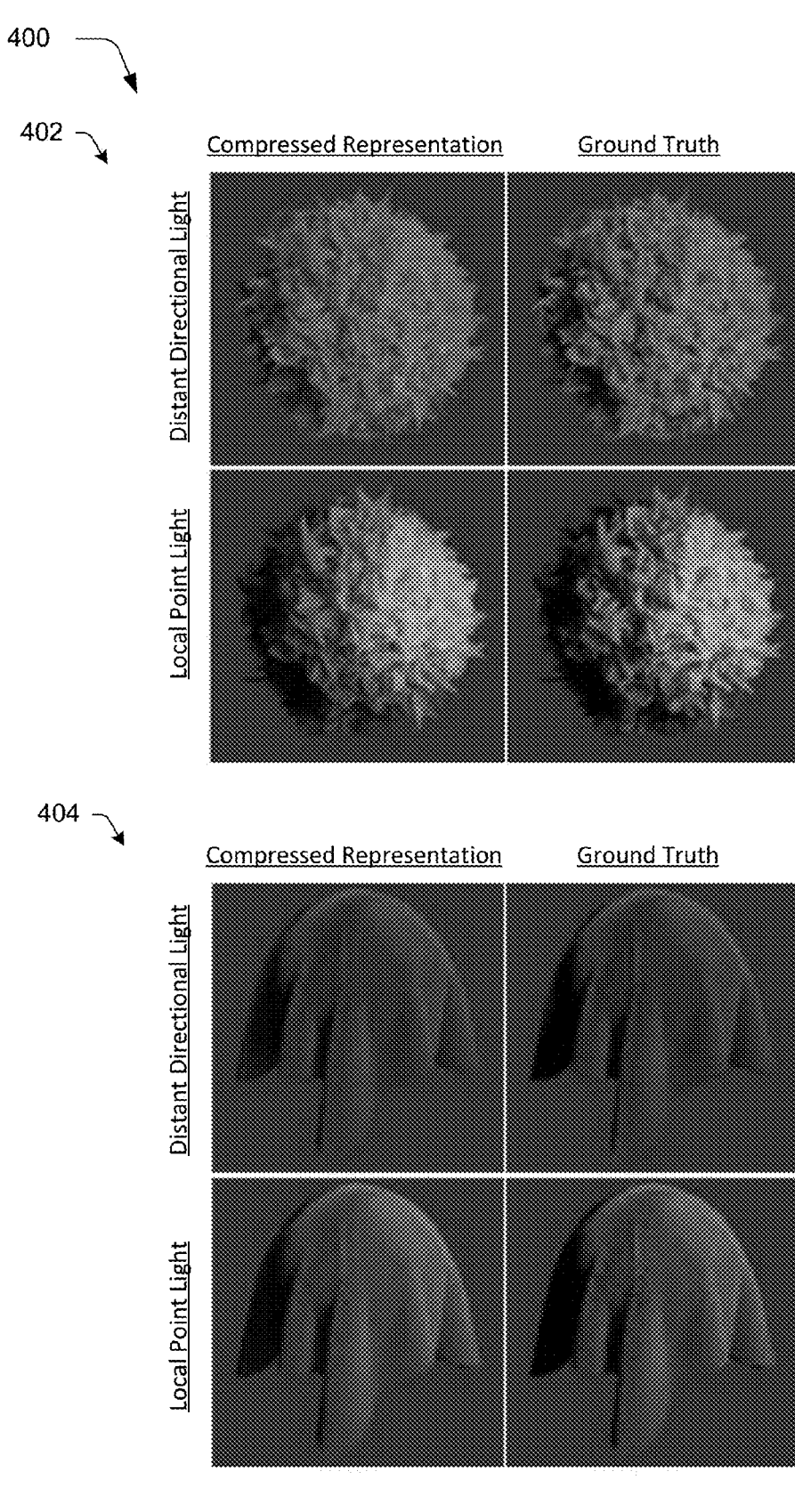
FIG. 4 depicts an example of generation of relit fiber assets based on a compressed representation for various asset types and lighting conditions.

FIG. 4 depicts an example 400 of generation of relit fiber assets based on a compressed representation 118 for various asset types and lighting conditions in a first example 402 and a second example 404. For instance, as shown in the first example 402, a compressed representation 118 is based on a golden fur ball that includes long fibers with a bright albedo, e.g., the surface of the ball reflects a significant portion of incident light. In accordance with the techniques described herein, the representation module 116 renders the compressed representation 118 to depict the golden ball in a first digital scene with a distance directional light source, as well as a second digital scene with a local point light source.

The first example 402 further depicts ground truth images generated using path tracing techniques, which are photorealistic however are computationally expensive to generate. As illustrated, the renderings based on the compressed representation 118 of the golden ball include accurate lighting and color and have a visual quality comparable to the ground truth images. For instance, the renderings based on the compressed representation 118 include accurate fiber shadowing and subtle glow illumination.

As shown in the second example 404, a compressed representation 118 based on a red fur cloth is rendered. In contrast to the fur ball depicted in the first example 402, the cloth in this example includes dense, short fibers. Similar to the above example, the representation module 116 renders the compressed representation 118 to depict the red fur cloth in a first digital scene with a distance directional light source, as well as a second scene with a local point light source. As illustrated, the renderings based on the compressed representation 118 of the red fur cloth are photorealistic and have a visual quality comparable to ground truth images. For instance, the renderings based on the compressed representation 118 depict subtle highlights on tips and sides of the short fibers. Accordingly, the techniques described herein support generation of relightable digital assets that depict a variety of materials under a variety of lighting conditions with reduced computational consumption.

Figure 5:
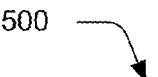
FIG. 5 depicts an example of generation of relit fiber assets based on a compressed representation with a changed condition of a digital light source.

FIG. 5 depicts an example 500 of generation of relit fiber assets based on a compressed representation 118 with a changed condition of a digital light source in stages 502, 504, 506, 508, 510, 512, 514, 516, and 518. In various implementations, a condition of digital light source, (e.g., an intensity of the digital light source, a spatial location of the digital light source within the digital scene, a type of illumination, etc.) is changed. Accordingly, the rendering module 214 is operable to update the one or more lighting effects based on the changed condition. In the illustrated example, for instance, a compressed representation 118 is rendered to depict a golden fur ball, e.g., the golden fur ball discussed with respect to FIG. 4, in a digital scene with a moving directional light source while a view direction of the fur ball remains consistent. As depicted, as the light source moves around the fur ball from first stage 502 to the final stage 518 the appearance of the fur ball is updated in accordance with the rendering techniques described herein.

Conventional approaches to render such digital assets include computation of a complex light transport including multiple scattering interactions at each stage, which involves significant processing resources and time to render, e.g., on the scale of hours. However, by precomputing the light transport the techniques described herein enable visualization of dynamic interactions within a digital scene with reduced rendering times, e.g., on the scale of seconds. Thus, the techniques described herein are usable in a variety of real-time applications, as well as implementable on low-resource and/or standard resource devices, which is not possible using conventional techniques.

Figure 6:
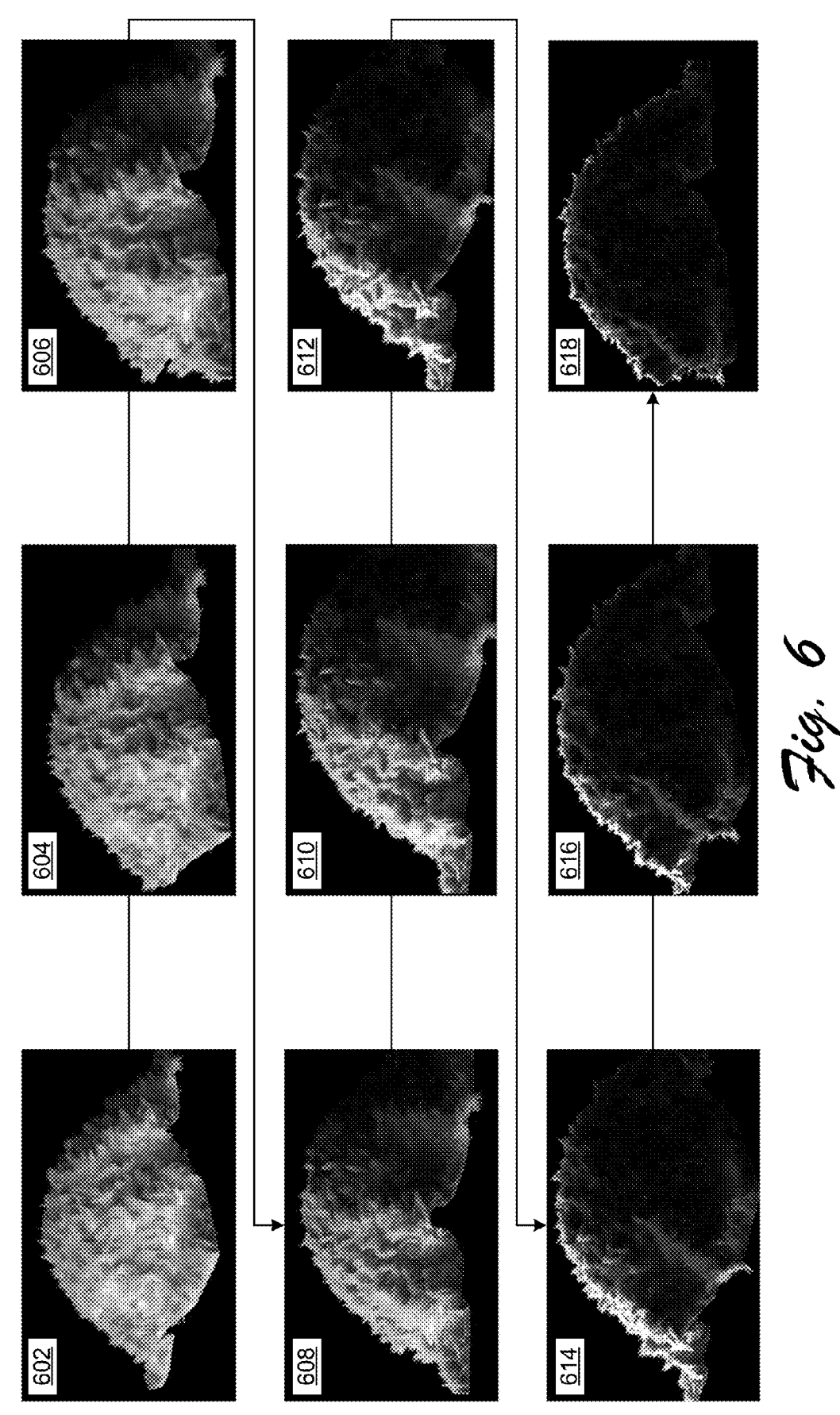
FIG. 6 depicts an example of generation of relit fiber assets based on a compressed representation with a moving view direction.

FIG. 6 depicts an example 600 of generation of relit fiber assets based on a compressed representation 118 with a moving view direction in stages 602, 604, 606, 608, 610, 612, 614, 616, and 618. In this example, a compressed representation 118 is rendered to depict a white fur cloth in a digital scene with a nonmoving light source. However, progressing from stage 602 to stage 618, a view direction of the white fur cloth changes. As illustrated, the appearance of the white fur cloth dynamically responds to the changed view direction. Similar to the example in FIG. 5, conventional approaches to render such digital assets consume significant processing resources and thus are not practical for a variety of real-world scenarios. Using the techniques described herein, however, the relit asset 124 is dynamically updated based on a variety of changing scene conditions.

FIG. 7 depicts an example 700 of high-fidelity renderings of fiber assets generated in accordance with the techniques described herein in a first example 702 and a second example 704. The first example 702 depicts a close-up view of a rendering of a compressed representation 118 (e.g., a relit asset 124) of a blonde hair assembly, as well as a reference image, e.g., a ground truth image. Similarly, the second example 704 depicts a close-up view of a rendering of a compressed representation 118 of a darker hair assembly compared to a reference image. As illustrated, the techniques described herein enable comprehensive determination of radiance values at a pixel level, which supports high-fidelity renderings. Further, because the compressed representation 118 takes into consideration a fiber axis offset (e.g., h as discussed with respect to FIG. 3) the relit asset 124 is able to depict subtle variations across the width of individual fibers. This level of detail is not possible using conventional methods that attempt to simplify the rendering process, e.g., via a simplified shading model.

FIG. 8 depicts an additional example 800 of generation of relightable fiber assets based on a compressed representation 118 for various asset types and lighting conditions in a first example 802 and a second example 804. As illustrated in the first example 802, a relit asset 124 generated in accordance with the techniques described herein that depicts blonde hair and a relit asset 124 that depicts dark hair are rendered for display. In this example, the two hair assets are rendered under local area lighting and are displayed from a variety of view directions.

The second example 804 depicts various digital assets 122 that are relit in accordance with the techniques described herein. For instance, a red fur cloth, a white fur cloth, and a golden fur ball are rendered for display under local point lighting. As illustrated, the renderings for each asset type are photorealistic across various lighting types and view directions. This example further demonstrates the variety of the digital assets 122 and lighting conditions that are representable using the techniques described herein in a computationally efficient manner. Although not illustrated, the techniques described herein are further extensible to non-fiber assets that include complex light interactions such as granular media (e.g., an assembly of solid particles and/or grains), foliage, geometric shapes, etc.

Example System and Device

FIG. 10 illustrates an example system generally at 1000 that includes an example computing device 1002 that is representative of one or more computing systems and/or devices that implement the various techniques described herein. This is illustrated through inclusion of the representation module 116. The computing device 1002 is configurable, for example, as a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interface 1008 that are communicatively coupled, one to another. Although not shown, the computing device 1002 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware and/or cause a processing device to perform one or more operations. Accordingly, the processing system 1004 is illustrated as including hardware element 1010 that is configurable as processors, functional blocks, and so forth. This includes implementation in hardware as an application specific integrated circuit or other logic device formed using one or more semiconductors. The hardware elements 1010 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1006 is illustrated as including memory/storage 1012. The memory/storage 1012 represents memory/storage capacity associated with one or more computer-readable media. The memory/storage 1012 includes volatile media (such as random access memory (RAM)) and/or nonvolatile media (such as read only memory (ROM), Flash memory, optical disks, magnetic disks, and so forth). The memory/storage 1012 includes fixed media (e.g., RAM, ROM, a fixed hard drive, and so on) as well as removable media (e.g., Flash memory, a removable hard drive, an optical disc, and so forth). The computer-readable media 1006 is configurable in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1002. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1002, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also able to be employed to implement various techniques described herein. Accordingly, software, hardware, or executable modules are implemented as one or more instructions and/or logic embodied on some form of computer-readable storage media and/or by one or more hardware elements 1010. The computing device 1002 is configured to implement particular instructions and/or functions corresponding to the software and/or hardware modules. Accordingly, implementation of a module that is executable by the computing device 1002 as software is achieved at least partially in hardware, e.g., through use of computer-readable storage media and/or hardware elements 1010 of the processing system 1004. The instructions and/or functions are executable/operable by one or more articles of manufacture (for example, one or more computing devices 1002 and/or processing systems 1004) to implement techniques, modules, and examples described herein.

The techniques described herein are supported by various configurations of the computing device 1002 and are not limited to the specific examples of the techniques described herein. This functionality is also implementable all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 abstracts resources and functions to connect the computing device 1002 with other computing devices. The platform 1016 also serves to abstract scaling of resources to provide a corresponding level of scale to encountered demand for the resources 1018 that are implemented via the platform 1016. Accordingly, in an interconnected device embodiment, implementation of functionality described herein is distributable throughout the system 1000. For example, the functionality is implementable in part on the computing device 1002 as well as via the platform 1016 that abstracts the functionality of the cloud 1014.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:

receiving, by a processing device, a digital asset to be included in a three-dimensional digital scene, the digital asset including fiber primitives;

generating, by the processing device, a training dataset that includes training images depicting the digital asset, the training dataset including one or more training samples per pixel that depicts the digital asset within the training images, a respective training sample of a respective pixel including one or more parameters that are specific to an individual fiber primitive on which the respective pixel is depicted;

generating, by the processing device, a compressed representation of the digital asset that includes a precomputed light transport for the fiber primitives at least partially encoded into a neural model that includes a multilayer perceptron and a feature grid corresponding to a cube of data spatially aligned with cylindrical representations of the fiber primitives, the compressed representation generated by jointly training the feature grid and the multilayer perceptron using the training dataset;

inserting, by the processing device, the compressed representation of the digital asset into a location relative to a digital light source within the three-dimensional digital scene; and applying, by the processing device, one or more lighting effects to the fiber primitives based on the precomputed light transport and the location relative to the digital light source.

2. The method as described in claim 1, wherein the applying the one or more lighting effects is based on a view direction of the compressed representation within the three-dimensional digital scene.

3. The method as described in claim 1, wherein the applying the one or more lighting effects includes determining an intersection point of a ray traced from a virtual camera that defines a view direction with a fiber primitive of the compressed representation and computing a color value to apply to the fiber primitive at the intersection point based on the precomputed light transport.

4. The method as described in claim 3, wherein the compressed representation includes the feature grid that parameterizes a geometry of the cylindrical representations of the fiber primitives and the multilayer perceptron, and wherein the applying the one or more lighting effects includes extracting a feature vector from the feature grid based on the intersection point and evaluating the feature vector using the multilayer perceptron to determine the color value.

5. The method as described in claim 4, wherein the feature vector is combined with the view direction, a light direction, a fiber direction, and a fiber axis offset for the intersection point for input to the multilayer perceptron.

6. The method as described in claim 1, wherein the training images depict the digital asset viewed from a plurality of different locations within the three-dimensional digital scene.

7. The method as described in claim 6, wherein generating the compressed representation includes utilizing the training dataset to adjust weights of the multilayer perceptron of the compressed representation and update the feature grid of the compressed representation.

8. The method as described in claim 1, wherein the precomputed light transport represents a scattering interaction of light rays that interact with the fiber primitives.

9. The method as described in claim 1, wherein the applying the one or more lighting effects includes applying RGB color values to points along the fiber primitives.

10. The method as described in claim 1, wherein the feature grid is defined by a UVT coordinate system, a U-axis and a V-axis of the UVT coordinate system representing a flattened structure of the digital asset and a T-axis of the UVT coordinate system representing a length of the cylindrical representations of the fiber primitives.

11. The method as described in claim 1, wherein the one or more parameters include that are specific to the individual fiber primitive include one or more of:

an intersection point at which a ray traced from a virtual camera intersects with the individual fiber primitive;

a fiber axis offset defining a first distance from a center of the individual fiber primitive to the intersection point; and a second distance from a base of the individual fiber primitive to the intersection point.

12. The method as described in claim 1, wherein jointly training the feature grid and the multilayer perceptron using the training dataset includes:

receiving a ground truth radiance for the respective pixel;

receiving the respective training sample of the respective pixel;

generating a predicted radiance for the respective pixel based on the one or more parameters that are specific to the individual fiber primitive on which the respective pixel is depicted; and adjusting parameters of the feature grid and the multilayer perceptron based on the ground truth radiance and the predicted radiance.

13. A system comprising:

a memory component; and a processing device coupled to the memory component, the processing device to perform operations comprising:

receiving a digital asset to be included in a three-dimensional digital scene, the digital asset including fiber primitives;

generating a training dataset that includes training images depicting the digital asset, the training dataset including one or more training samples per pixel that depicts the digital asset within the training images, a respective training sample of a respective pixel including one or more parameters that are specific to an individual fiber primitive on which the respective pixel is depicted;

generating a compressed representation of the digital asset that includes a precomputed light transport for the fiber primitives, the precomputed light transport at least partially represented by a neural model that includes a multilayer perceptron and a feature grid corresponding to a cube of data aligned with cylindrical representations of the fiber primitives, the compressed representation generated by jointly training the feature grid and the multilayer perceptron using the training dataset;

inserting the compressed representation of the digital asset into a location relative to a digital light source within the three-dimensional digital scene; and applying one or more lighting effects to the fiber primitives based on the precomputed light transport and the location relative to the digital light source.

14. The system as described in claim 13, wherein the applying the one or more lighting effects includes determining an intersection point of a ray traced from a virtual camera that defines a view direction with a fiber primitive of the compressed representation and computing a color value to apply to the fiber primitive at the intersection point based on the precomputed light transport.

15. The system as described in claim 14, wherein the compressed representation includes the feature grid that parameterizes a geometry of the cylindrical representations of the fiber primitives and the multilayer perceptron, and wherein the applying the one or more lighting effects includes extracting a feature vector from the feature grid based on the intersection point and evaluating the feature vector using the multilayer perceptron to determine the color value.

16. The system as described in claim 15, wherein the feature vector represents the view direction, a light direction, a fiber direction, and a fiber axis offset for the intersection point for input to the multilayer perceptron.

17. A non-transitory computer-readable medium storing executable instructions, which when executed by a processing device, cause the processing device to perform operations comprising:

receiving a digital asset to be included in a three-dimensional digital scene, the digital asset including fiber primitives;

generating a training dataset that includes training images depicting the digital asset, the training dataset including one or more training samples per pixel that depicts the digital asset within the training images, a respective training sample of a respective pixel including one or more parameters that are specific to an individual fiber primitive on which the respective pixel is depicted;

generating a compressed representation of the digital asset that includes a precomputed light transport for the digital asset represented at least partially by a neural model that includes a multilayer perceptron and a feature grid that corresponds to a cube of data spatially aligned with the fiber primitives of the digital asset, the compressed representation generated by jointly training the feature grid and the multilayer perceptron using the training dataset;

inserting the compressed representation of the digital asset into a location relative to a digital light source within the three-dimensional digital scene; and displaying the compressed representation with one or more lighting effects applied based on the precomputed light transport and the location relative to the digital light source.

18. The non-transitory computer-readable medium as described in claim 17, further comprising changing a condition of the digital light source and updating the one or more lighting effects based on the changed condition of the digital light source, the condition including one or more of an intensity of the digital light source, a spatial location of the digital light source within the three-dimensional digital scene, or a type of illumination of the digital light source.

19. The non-transitory computer-readable medium as described in claim 17, further comprising changing a view direction of the compressed representation in the three-dimensional digital scene and updating the one or more lighting effects based on the changed view direction.

20. The non-transitory computer-readable medium as described in claim 17, wherein the digital asset defines a three-dimensional representation of a granular media.

* * * * *